(12) United States Patent
Gottschling et al.

(10) Patent No.: US 12,397,411 B2
(45) Date of Patent: Aug. 26, 2025

(54) POWER TOOL STAND

(71) Applicant: BLACK & DECKER INC., New Britain, CT (US)

(72) Inventors: Rafael Gottschling, Selters-Eisenbach (DE); Daniel Kadlecek, Bischofsheim (DE); Birju Patel, Ruislip (GB)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/687,620

(22) PCT Filed: Sep. 6, 2022

(86) PCT No.: PCT/EP2022/074710
§ 371 (c)(1),
(2) Date: Feb. 28, 2024

(87) PCT Pub. No.: WO2023/036766
PCT Pub. Date: Mar. 16, 2023

(65) Prior Publication Data
US 2024/0367308 A1    Nov. 7, 2024

(30) Foreign Application Priority Data
Sep. 8, 2021 (GB) ..................... 2112788

(51) Int. Cl.
*B25H 1/00* (2006.01)
*B23B 39/10* (2006.01)
*B23B 45/00* (2006.01)

(52) U.S. Cl.
CPC .......... *B25H 1/0042* (2013.01); *B23B 39/10* (2013.01); *B23B 45/003* (2013.01); *B25H 1/0064* (2013.01)

(58) Field of Classification Search
CPC .... B25H 1/0042; B25H 1/0064; B23B 39/10; B23B 45/003
See application file for complete search history.

(56) References Cited

U.S. PATENT DOCUMENTS

| | | | |
|---|---|---|---|
| 2,466,965 | A | 4/1949 | Pitts |
| 2,629,267 | A | 2/1953 | Hart |

(Continued)

FOREIGN PATENT DOCUMENTS

| | | |
|---|---|---|
| DE | 20017256 U1 | 12/2000 |
| DE | 20108167 U1 | 8/2001 |

(Continued)

OTHER PUBLICATIONS

International Search Report mailed Nov. 28, 2022 in PCT Application No. PCT/EP2022/074710, 16 pages.

(Continued)

*Primary Examiner* — Michelle Lopez
(74) *Attorney, Agent, or Firm* — Womble Bond Dickinson (US) LLP

(57) ABSTRACT

A power tool stand for a removeable power tool has a first battery interface and a removeable battery having a first tool interface. The power tool stand comprises a base and a projecting frame connected to the base. A power tool carriage is moveably mounted on the projecting frame and the power tool carriage comprising a second battery interface and a second tool interface. The second battery interface is compatible with the first tool interface and the second battery interface is arranged to electrically and mechanically connect together with first tool interface. The second tool interface is compatible with the first battery interface and the second tool interface is arranged to electrically and mechanically connect together with first battery interface. The first battery interface and the first tool interface are incompatible.

20 Claims, 15 Drawing Sheets

(56) References Cited

U.S. PATENT DOCUMENTS

| | | | |
|---|---|---|---|
| 3,412,813 | A | 11/1968 | Johnson |
| 3,464,655 | A | 9/1969 | Schuman |
| 3,790,059 | A | 2/1974 | Jacke et al. |
| 4,365,418 | A | 12/1982 | Hoyss et al. |
| 4,375,931 | A | 3/1983 | Erdt |
| 4,500,235 | A | 2/1985 | Johnsen |
| 4,540,149 | A | 9/1985 | Rupprecht et al. |
| 4,634,320 | A | 1/1987 | Itzov |
| 4,655,649 | A | 4/1987 | Itzov et al. |
| 5,062,743 | A | 11/1991 | Wieland et al. |
| 5,713,702 | A | 2/1998 | Turner |
| 5,794,724 | A | 8/1998 | Moller |
| 5,899,644 | A | 5/1999 | Buck et al. |
| 6,223,794 | B1 | 5/2001 | Jones |
| 6,514,018 | B2 | 2/2003 | Martinez et al. |
| 6,692,201 | B2 | 2/2004 | Soderman |
| 6,792,735 | B2 | 9/2004 | Mohlenhoff |
| 6,981,560 | B2 | 1/2006 | Nguyen et al. |
| 7,214,007 | B2 | 5/2007 | Baratta |
| 7,347,651 | B2 | 3/2008 | Hintze et al. |
| 7,371,034 | B2 | 5/2008 | Clark |
| 7,476,066 | B2 | 1/2009 | Topf |
| 7,591,615 | B2 | 9/2009 | Li et al. |
| 8,337,124 | B2 | 12/2012 | Nguyen |
| 9,174,283 | B2 | 11/2015 | Timmons et al. |
| 9,452,522 | B2 | 9/2016 | Timmons et al. |
| 9,555,481 | B2 | 1/2017 | Nowland |
| 9,782,865 | B2 | 10/2017 | Richt et al. |
| 9,789,600 | B2 | 10/2017 | Jönsson et al. |
| 10,821,525 | B2 | 11/2020 | Carlson et al. |
| 11,148,210 | B2 | 10/2021 | Carlson et al. |
| 11,331,730 | B2 | 5/2022 | Carlson et al. |
| 11,858,113 | B2 | 1/2024 | Carlson et al. |
| 11,982,184 | B2 * | 5/2024 | Schmitz .............. E21B 7/027 |
| 2008/0083106 | A1 | 4/2008 | Elsworthy |
| 2015/0290793 | A1 | 10/2015 | Jönsson et al. |
| 2016/0129582 | A1 * | 5/2016 | Ullrich .............. B23Q 3/1543 |
| | | | 408/76 |
| 2016/0151873 | A1 | 6/2016 | Richt et al. |
| 2016/0151934 | A1 | 6/2016 | Pfeifer et al. |
| 2016/0250693 | A1 | 9/2016 | Timmons et al. |
| 2017/0232605 | A1 | 8/2017 | Morton |
| 2018/0119536 | A1 | 5/2018 | Drexl et al. |
| 2018/0133929 | A1 | 5/2018 | Drexl et al. |
| 2018/0297126 | A1 | 10/2018 | Drexl et al. |
| 2018/0297235 | A1 | 10/2018 | Drexl et al. |
| 2019/0093738 | A1 | 3/2019 | Almqvist et al. |
| 2019/0321896 | A1 * | 10/2019 | Carlson .............. B25H 1/0042 |
| 2021/0178571 | A1 | 6/2021 | Denzel et al. |
| 2023/0046097 | A1 | 2/2023 | Hölderle et al. |
| 2023/0070551 | A1 | 3/2023 | Kugler et al. |
| 2023/0234209 | A1 | 7/2023 | Luo et al. |
| 2024/0051096 | A1 | 2/2024 | Sergyeyenko et al. |

FOREIGN PATENT DOCUMENTS

| | | |
|---|---|---|
| DE | 10064173 C1 | 6/2002 |
| DE | 10230460 A1 | 1/2004 |
| DE | 202005020829 U1 | 11/2006 |
| DE | 202005011822 U1 | 12/2006 |
| DE | 202012003188 U1 | 6/2012 |
| DE | 212018000029 U1 | 11/2018 |
| EP | 1671769 B1 | 3/2011 |
| EP | 3006145 B1 | 2/2018 |
| EP | 3004517 B1 | 7/2018 |
| EP | 4306267 A1 | 1/2024 |
| GB | 622855 A | 5/1949 |
| GB | 2299772 A | 10/1996 |
| WO | 2018225379 A1 | 12/2018 |

OTHER PUBLICATIONS

International Search Report dated Dec. 12, 2022 in PCT Application No. PCT/EP2022/074708, 16 pages.

Notice of Allowance and Fees mailed Jul. 31, 2024 in U.S. Appl. No. 17/929,192, 8 pages.

Notice of Allowance and Fees mailed Dec. 18, 2024 in U.S. Appl. No. 17/929,172, 8 pages.

Non-Final Office Action mailed Dec. 18, 2024 in U.S. Appl. No. 17/929,161, 11 pages.

Extended European Search Report mailed Dec. 14, 2023 in EP Application No. 23177865.5, 8 pages.

* cited by examiner

POWER TOOL STAND

RELATED APPLICATION

This application is a national stage of PCT International Application No. PCT/EP2022/074710 filed Sep. 6, 2022, which claims priority to GB Patent Application No. 2112788.1 filed Sep. 8, 2021, the contents of both of which are incorporated herein by reference in their entirety.

TECHNICAL FIELD

The present disclosure relates to a power tool stand. In particular the present disclosure relates to drill power tool stand.

BACKGROUND

Some power tools are mountable on a tool stand. For example, certain drills can be mountable on a drill stand. This can improve the stability of the power tool during use and ensure that the power tool alignment with respect to the workpiece remains fixed during use. Furthermore, the power tool stand can be mountable onto the workpiece and this can further improve precision during operation.

One such power tool stand is shown in US 2019/0321896 which shows a drill stand on which a battery powered drill can be mounted. A problem with this is that the drill power tool is very large and heavy and this makes mounting and using the drill power tool on the drill power tool stand cumbersome. For example, the base of the drill power tool stand may need to be weighted down during use to stop it toppling over when used in a vertical orientation.

Once the drill described in US 2019/0321896 is mounted on the drill stand, then suitable dust management and lubrication management hoses may need to be attached to the drill. These hoses can interfere with the operation of the drill when installed on the drill stand. This may make setup, use and removal of the drill on the drill stand awkward and time consuming.

The drill stand may be mounted on a workpiece surface. It is known to use a vacuum pump with the drill stand to provide a suction force against the workpiece surface as shown US2016/151934. A problem with this is that a control unit detects signals from an accelerometer to detect vibrations in the drill stand to infer a poor seal against the workpiece surface. However, if the drill experiences vibrations due to other issues, the control unit can incorrectly control the vacuum pump.

SUMMARY

In a first aspect of the disclosure, there is provided a power tool stand for a removeable power tool having a first battery interface and a removeable battery having a first tool interface, the power tool stand comprising: a base; a projecting frame connected to the base; and a power tool carriage moveably mounted on the projecting frame, the power tool carriage comprising a second battery interface and a second tool interface; wherein the second battery interface is compatible with the first tool interface and the second battery interface is arranged to electrically and mechanically connect together with first tool interface; and the second tool interface is compatible with the first battery interface and the second tool interface is arranged to electrically and mechanically connect together with first battery interface; and the first battery interface and the first tool interface are incompatible.

Optionally, the power tool carriage comprises a battery adapter comprising the second battery interface.

Optionally, the battery adapter is mountable to the power tool carriage.

Optionally, the battery adapter comprises a carriage interface and the power tool carriage comprises an adaptor interface and adaptor interface is compatible with the carriage interface and the adaptor interface is arranged to electrically and mechanically connect together with carriage interface.

Optionally, the carriage interface is the same as the second tool interface and the adaptor interface is the same as the first battery interface.

Optionally, the battery adaptor is removably mountable to the power tool carriage.

Optionally, the second battery interface is configured to mechanically and electrically connect to a battery having a voltage of at least 60V.

Optionally, the power tool stand comprises a rack and pinion mechanism arranged to move the power tool carriage relative to the projecting frame.

Optionally, the power tool carriage comprises a handle coupled to the rack and pinion mechanism.

Optionally, the second battery interface is mounted on a first side of the power tool carriage and second tool interface is mounted on a second side of the power tool carriage.

Optionally, the second tool interface is arranged project over the base.

Optionally, the power tool stand comprises a plurality of the second battery interfaces arranged to electrically connect with a plurality of removeable batteries.

Optionally, the power tool carriage comprises a latch recess for engaging with a latch mechanism mounted on the removeable battery.

Optionally, the power tool carriage comprises an air duct connectable to a dust extractor.

Optionally, the power tool carriage comprises a water duct connectable to a water supply.

Optionally, the second battery interface is electrically connected to the second tool interface within the housing of the power tool carriage.

In a second aspect of the disclosure there is provided a power tool stand system comprising: a power tool stand according to the first aspect; a removeable power tool having a first battery interface and the first battery interface is connectable to the second tool interface of the power tool stand; and a first removable battery having a first tool interface and the first tool interface is connectable to the second battery interface of the power tool stand.

Optionally, the power tool stand system comprises a second battery having a third tool interface compatible with the first battery interface.

In a third aspect of the disclosure there is provided a power tool stand comprising: a base; a projecting frame connected to the base; and a power tool carriage moveably mounted on the projecting frame; wherein the power tool carriage comprises a tool interface arranged to electrically connect with a removeable power tool and a first battery interface and a second battery interface, the first battery interface and the second battery interface being in electrical connection with the tool interface; wherein first battery interface and the second battery interface are respectively arranged to electrically connect with a first removeable battery and a second removeable battery.

Optionally, the first battery interface and the second battery interface are configured to connect the first removeable battery and the second removeable battery in series.

Optionally, the first battery interface and the second battery interface are configured to connect the first removeable battery and the second removeable battery in parallel.

Optionally, the power tool stand comprises a controller configured to selectively connect the first removeable battery and the second removeable battery to the power tool when the removable power tool, the first removeable battery, and the second removeable battery are mounted on the power tool carriage.

Optionally, the controller is configured to connect the first removeable battery and/or the second removeable battery to the removable power tool in dependence of a received signal.

Optionally, the received signal is a manually actuated signal indicating a user battery selection.

Optionally, the received signal comprises a voltage indication of the first removeable battery and/or the second removeable battery and the controller is configured to connect the removeable power tool to the first removeable battery and/or the second removeable battery in dependence of the voltage indication of the first removeable battery and/or the second removeable battery.

Optionally, the controller is configured to connect the first removeable battery and the second removeable battery to the removable power tool in series, in parallel or separately.

Optionally, the controller is configured to compare the voltage indication of the first removeable battery and the second removeable battery and connect the first removeable battery or the second removeable battery in dependence of the voltage indication of the first removeable battery or the second removeable battery being closest to a required voltage of the removeable power tool.

Optionally, wherein the required voltage of the removable power tool is in dependence of the motor speed, a motor voltage rating, or a motor parameter.

Optionally, the received signal comprises an indication that a status of either the first removeable battery or the second removeable battery has exceeded a threshold and the controller is configured to connect the motor to the other of the at least one first removeable battery or the at least one second removeable battery which has not exceeded the threshold.

Optionally, the threshold is a battery operating temperature threshold, a battery capacity threshold, a battery voltage threshold, or a battery current threshold.

Optionally, the received signal is signal indicating an error status of either the first removeable battery or the second removeable battery is malfunctioning or disconnected and the controller is configured to connect the removeable power tool to the other of the first removeable battery or the second removeable battery.

Optionally, the first battery interface and the second battery interface are mounted on a first side of the power tool carriage and tool interface is mounted on a second side of the power tool carriage.

Optionally, the tool interface is arranged to project over the base.

In a fourth aspect of the disclosure, there is provided a power tool stand comprising: a base; a projecting frame connected to the base; a power tool carriage moveably mounted on the projecting frame; a tool interface mounted on the power tool carriage arranged to couple with a removeable power tool; an electrical interface mounted on the power tool carriage arranged to electrically couple with a removeable battery; wherein the power tool stand comprises at least one duct configured to convey a fluid; and at least one pump in fluid communication with the fluid duct wherein the at least one pump is in electrical connection with the electrical interface.

Optionally, the at least one duct is connected to a fluid connector configured to engage with a power tool fluid duct when the removeable power tool is mounted to the power tool carriage.

Optionally, the at least one duct is in fluid communication with a water supply.

Optionally, the water supply is a non-pressurised water supply.

Optionally, the water supply is a water reservoir.

Optionally, power tool carriage comprises a switch in electrical connection with the at least one pump configured to selectively control actuation of the at last one pump.

Optionally, the switch is configured to selectively control actuation of the at last one pump when the removeable power tool and the removeable battery are mounted on the power tool carriage.

Optionally, the at least one pump is mounted in the power tool carriage.

Optionally, the at least one duct is mounted on the power tool carriage.

Optionally, the power tool stand comprises a controller configured to selectively control actuation of the at last one pump.

Optionally, the tool interface comprises a power tool electrical interface mounted on the power tool carriage arranged to electrically couple with the removeable power tool.

Optionally, the power tool electrical interface is in electrical connection with the electrical interface.

In a fifth aspect of the disclosure, there is provided a power tool stand comprising: a base mountable on a workpiece surface; a frame connected to the base; a power tool carriage mounted on the frame; a tool interface mounted on the power tool carriage arranged to secure a removeable power tool; a work surface seal mounted on the base and configured to engage the workpiece surface and in fluid communication with a vacuum source and the work surface seal is configured to generate a vacuum seal against the workpiece surface when the vacuum source is actuated; a pressure sensor in fluid communication with the work surface seal and configured to generate a pressure signal; and a controller configured to determine when the vacuum pressure in work surface seal is decreasing in dependence of the received pressure signal from the pressure sensor and issue one or more control signals based on a detected decreased vacuum pressure in the work surface seal; wherein the power tool carriage comprises a battery interface arranged to secure a removeable battery and the battery interface is electrically connected to the tool interface.

Optionally, the controller is configured to send a control signal to the removeable power tool.

Optionally, the controller is configured to issue a first control signal in dependence of determining that the vacuum pressure in the work surface seal falls below a first vacuum pressure threshold.

Optionally, the first control signal is configured to issue an alert to the user when the vacuum pressure in the work surface seal falls below a first vacuum pressure threshold.

Optionally, the controller is configured to issue a second control signal in dependence of determining that the vacuum pressure of the work surface seal falls below a second vacuum pressure threshold, wherein the second vacuum pressure threshold is lower than the first vacuum pressure threshold.

Optionally, the second control signal is configured deactivate the removable power tool.

Optionally, the power tool carriage comprises a switch in electrical connection with the tool interface and the battery interface configured to selectively control actuation of the removeable power tool and the controller is configured to actuate the switch.

Optionally, the vacuum source is a vacuum pump.

Optionally, the vacuum pump is mounted in the power tool carriage or on the base.

Optionally, the vacuum pump is electrically connected to the removeable battery when the removeable battery is mounted to the battery interface.

Optionally, the controller is configured to issue a control signal to the vacuum pump to increase the vacuum pressure in the work surface seal.

Optionally, the pressure sensor is wirelessly connected or in wired connection with the controller.

Optionally, the work surface seal is configured mount to a vertical surface.

In a sixth aspect of the disclosure, there is provided a power tool stand comprising: a base mountable on a workpiece surface; a frame connected to the base; a power tool carriage mounted on the frame; a tool interface mounted on the power tool carriage arranged to secure a removeable power tool; a work surface seal mounted on the base and configured to engage the workpiece surface and in fluid communication with a vacuum source and the work surface seal is configured to generate a vacuum seal against the workpiece surface when the vacuum source is actuated; wherein the vacuum source is a vacuum pump mounted in the power tool stand.

Optionally, the vacuum pump is mounted in the power tool carriage.

Optionally, the vacuum pump is mounted in the base.

BRIEF DESCRIPTION OF THE DRAWINGS

Various other aspects and further examples are also described in the following detailed description and in the attached claims with reference to the accompanying drawings, in which:

DETAILED DESCRIPTION

Figure 1:
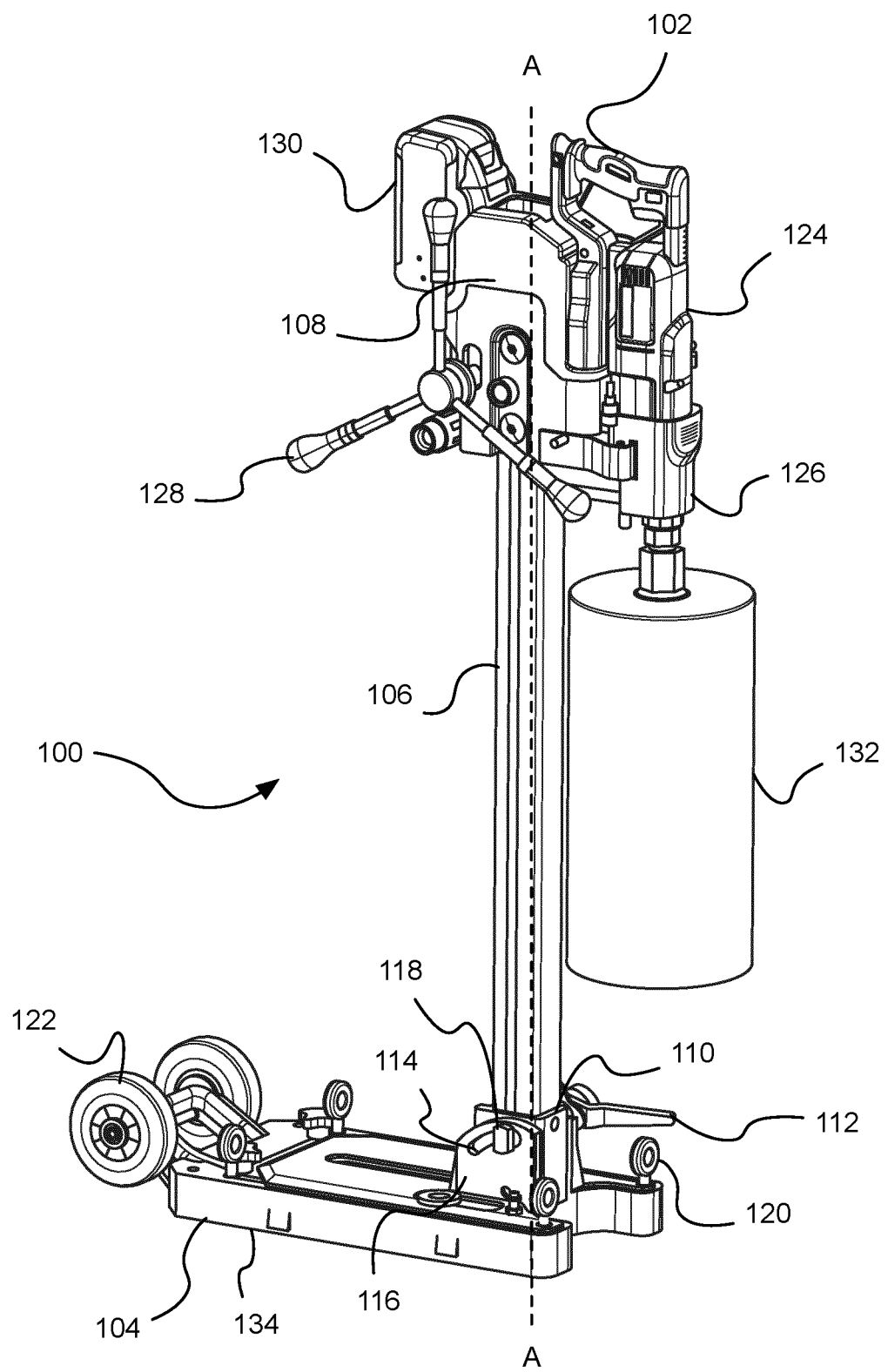
FIG. 1 shows a perspective view of a power tool stand according to an example.

FIG. 1 shows a perspective view of a power tool stand 100 according to an example. The power tool stand 100 is arranged to receive a removeable power tool 102. The removeable power tool 102 can be mounted and secured in the power tool stand 100 as required by the user. The term "removeable" refers to the function of the removeable power tool 102 being selectively removeable from the power tool stand 100. In other words, the removeable power tool 102 is not permanently fixed to the power tool stand 100.

Figure 2:
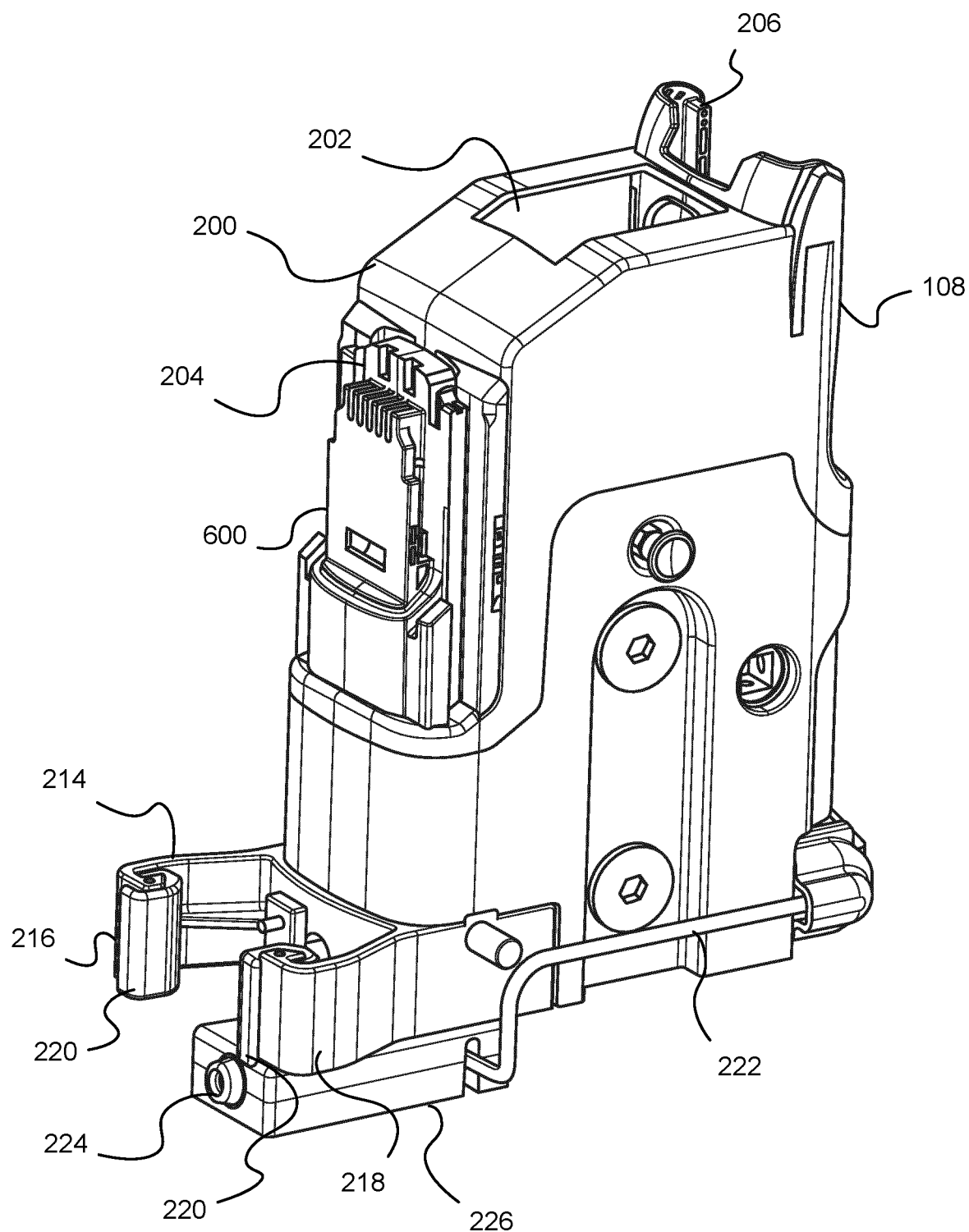
FIG. 2 shows a perspective view of part of a power tool stand according to an example.

The power tool stand 100 comprises a base 104 and a projecting frame 106 fixed to the base 104. A power tool carriage 108 is moveably mounted on the projecting frame 106 and moveable along a longitudinal axis A-A of the projecting frame 106. By moving the power tool carriage 108 along the projecting frame 106, the distance between the power tool carriage 108 and the base 104 can be varied. The projecting frame 106 projects through a through hole 202 (best shown in FIG. 2) in the power tool carriage 108. FIG. 2 shows a perspective view of the power tool carriage 108 of the power tool stand 100.

The power tool carriage 108 is optionally moveably coupled to projecting frame 106 via a carriage mechanism (not shown). In some less preferred examples (not shown in the Figs), the power tool carriage 108 is fixed with respect to the projecting frame 106 and does not move with respect to the power tool carriage 108.

Figure 8:
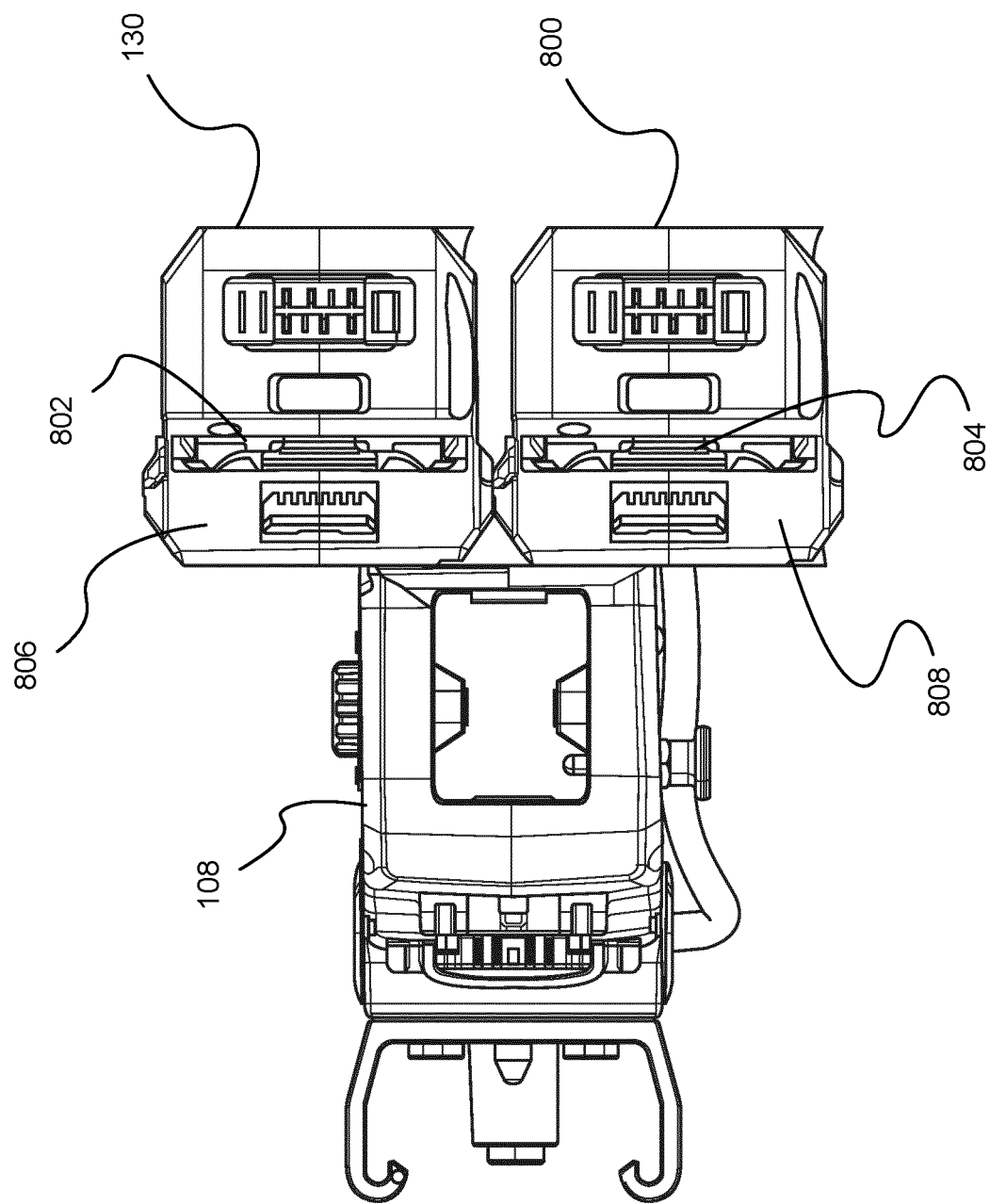
FIG. 8 shows a plan view of part of a power tool stand according to an example.

The projecting frame 106 as shown in FIG. 1 is substantially upright. In some examples, the power tool stand 100 can be used in the orientation as shown in FIG. 1 and in this case, the projecting frame 106 will remain substantially upright positioned on a workpiece surface 920 of a workpiece 918. The workpiece surface 920 is best shown in FIG. 8. FIG. 8 shows a plan view of the power tool carriage 108 of the power tool stand 100.

However, in some other examples, the power tool stand 100 can be used in a substantially horizontal orientation. In this case, the projecting frame 106 will be substantially horizontal. Indeed, the power tool stand 100 may be used in any orientation as required and the position of the projecting frame 106 will be adjusted accordingly.

Figure 9:
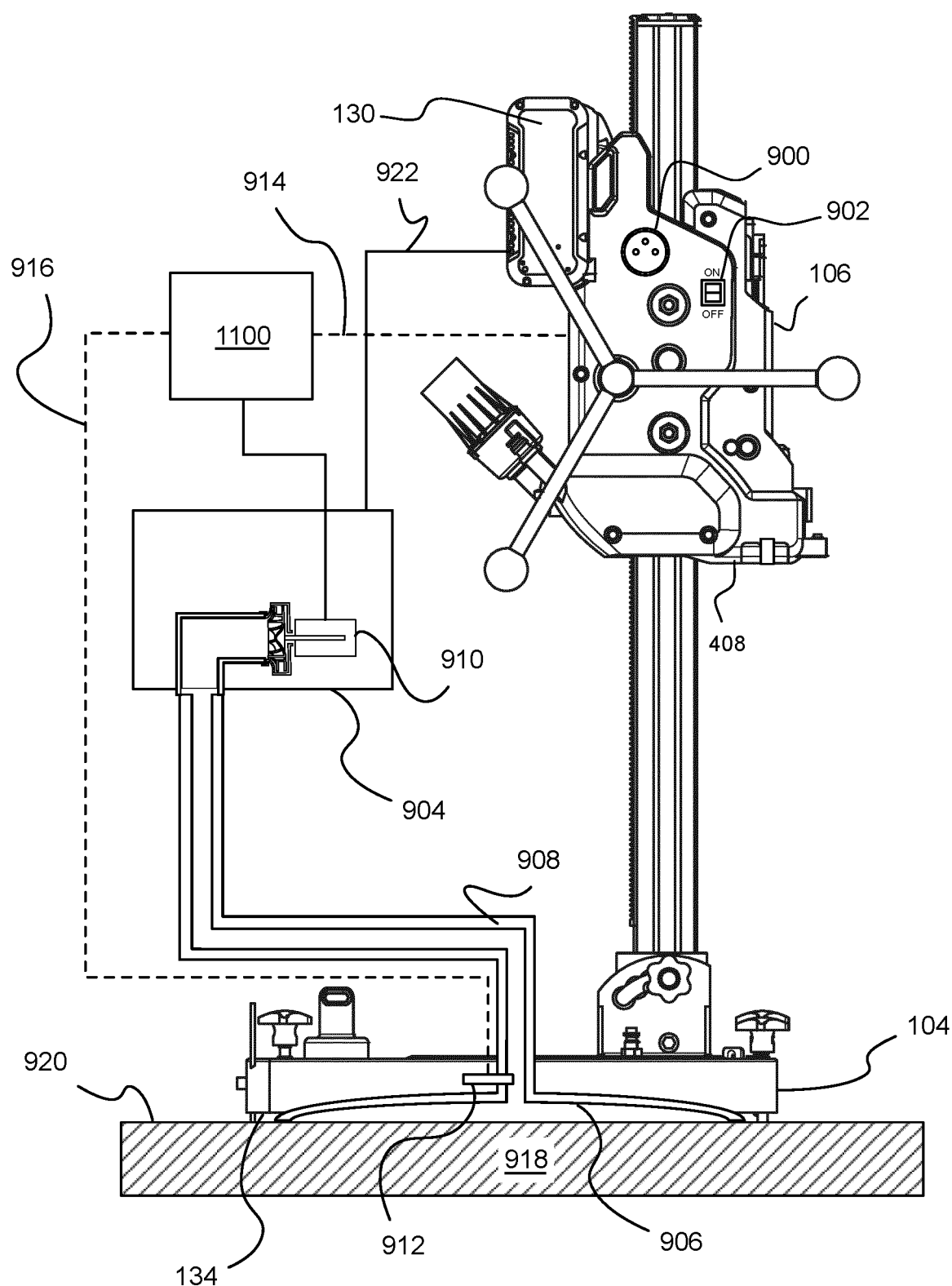
FIG. 9 shows a side view of a power tool stand according to an example.

The projecting frame 106 as shown in FIG. 1 is a single post projecting up from the base 104. However, in other examples the projecting frame 106 can optionally comprise a plurality of posts (not shown) projecting up from the base 104 and the power tool carriage 108 may be mounted on the plurality of posts. The projecting frame 106 as shown in FIG. 1 is mounted perpendicular to the plane of the base 104 at a coupling 110. The plane of the base 104 can be substantially parallel with the plane of a workpiece 918 (best shown in FIG. 9). FIG. 9 shows a side view of the power tool stand 100 with the removeable power tool 102 mounted thereon.

In some examples, the coupling 110 optionally comprises a pivot connection and the projecting frame 106 is pivotable with respect to the base 104. In this way, the projecting frame 106 can be angled with respect to a normal axis (not shown) of the plane of a workpiece 918. The normal axis of the plane of the workpiece 918 and the base 104 is parallel with the longitudinal axis A-A as shown in FIG. 1.

The coupling 110 comprises a screw fastener 112 threaded through arcuate slots 114 in a pair of projecting plates 116 fixed to the base 104. The screw fastener 112 is screwed into the projecting frame 106 or into a reciprocal fastening nut 118 (as shown in FIG. 2) on the opposite side of the projecting frame 106. When the screw fastener 112 and reciprocal fastening nut 118 are tightened against the projecting plates 116 and the projecting frame 106, frictional forces keep the projecting frame 106 fixed with respect to the base 104. Other fastening mechanisms e.g. clips, clamps, or any other suitable means can be used to fix the projecting frame 106 with respect to the base 104.

The pair of projecting plates 116 each comprises an arcuate slot 114 and form a yoke for receiving a portion of the projecting frame 106 between the projecting plates 116. The yoke as shown in FIG. 1 is optional and other pivot connections can be provided. For example a single projecting plate 116 can be used to couple the base 104 to the projecting frame 106. In some examples, the arcuate slot 114 optionally comprises a plurality of indexing positions (not shown) for positioning the reciprocal fastening nut 118 and the screw fastener 112 at predetermined positions along the arcuate slot 114.

Optionally, the projecting plates 116 comprise an inclination scale (not shown) to indicate the angle of the projecting frame 106 with respect to the plane of the base 104. In some examples the projecting frame 106 is arranged to pivot between 0 to 60 degrees from a normal axis (not shown) perpendicular to the base 104. In other examples, the projecting frame 106 can pivot any angle with respect to a normal axis perpendicular to the base 104.

In some examples, the projecting frame 106 is alternatively permanently fixed with respect to the base 104. In this case the projecting frame 106 cannot be adjusted with respect to the base 104. For example, the projecting frame 106 is welded to the base 104 in the upright position as shown in FIG. 1.

In some examples, the projecting frame 106 can be pivotable with respect to base 104 such that the longitudinal axis A-A of the projecting frame 106 can be positioned parallel with the plane of the base 104. This can be useful for transporting the power tool stand 100 to the work site.

In some examples, the projecting frame 106 comprises a reinforced cross-sectional shape for increasing rigidity of the projecting frame 106. The projecting frame 106 can optionally comprise an I-beam cross-sectional shape in some examples.

In some examples, the base 104 comprise one or more fixing bolts 120 for anchoring the base 104 of the power tool stand 100 to the workpiece 918. FIG. 1 shows the base 104 comprising four fixing bolts 120 located at each corner of the base 104. In some examples, there can be additional or fewer fixing bolts 120 for anchoring the base 104 to the workpiece 918 as required.

The fixing bolts 120 allow the power tool stand 100 to be securely fastened to a workpiece 918 surface in a horizontal plane, a vertical plane, or an inclined surface. For example a user may using the fixing bolts 120 to anchor the power tool stand 100 to a floor or a wall before operation.

When the user anchors the base 104 to a vertical surface such as a wall (not shown), the user may disassemble the power tool stand 100 and remove the projecting frame 106 from the base 104. Once the user has anchored the base 104 to the wall, the user may then reattach the projecting frame 106 back on the base 104.

The base 104 optionally comprises wheels 122 for transporting the power tool stand 100 to the worksite. The wheels 122 are mounted on the base 104 such that the wheels 122 do not project beyond an engaging surface 134 of the base 104. The engaging surface 134 is arranged to abut the workpiece surface 920. Accordingly, the wheels 122 do not touch the workpiece surface 920 when the engaging surface 134 abuts the workpiece surface 920. In some examples, the wheels 122 are optionally removable. This means the user can remove the wheels 122 when placing the power tool stand 100 in tight spaces on a wall or a floor.

The base 104 can optionally further comprise one or more stand handles (not shown) for also assisting transportation and handling. The user can optionally grasp the stand handle mounted on the base 104 and the projecting frame 106 in order to move the power tool stand 100 into position.

The power tool carriage 108 and power tool stand 100 will be discussed in more detail with respect to FIGS. 1 and 2. As shown in FIG. 2, the power tool carriage 108 is arranged to receive a removeable power tool 102 and a removeable battery 130. The projecting frame 106 allows a power tool carriage 108 to be precisely moved along the longitudinal axis A-A and then fixed with respect to the projecting frame 106.

The power tool carriage 108 comprises a carriage housing 200. The carriage housing 200 comprises a clam shell type construction having two halves which are fastened together. The halves of the carriage housing 200 are fastened together with screws but in alternative examples any suitable means for fastening the carriage housing 200 together may be used such as glue, clips, bolts and so on. For the purposes of clarity, the fastenings in the carriage housing 200 are not shown in FIG. 2. The carriage housing 200 can comprise a unitary element surrounding the internal components of the power tool carriage 108. In other examples, the carriage housing 200 can comprise one or more housing portions (not shown) which are mounted together to form the carriage housing 200.

The power tool carriage 108 comprises a power tool interface 204 arranged to electrically and mechanically connect the removeable power tool 102 to the power tool carriage 108.

The power tool carriage 108 further comprises a battery interface 206 arranged to electrically and mechanically connect the removeable battery 130 to the power tool carriage 108.

The power tool interface 204 and the battery interface 206 are electrically connected together via one or more internal wires (not shown) routed inside the carriage housing 200. The internal wires can be for example a flexible connection ribbon arranged to electrically couple pairs of electrical contacts on the power tool interface 204 and the battery interface 206. In other examples, power tool interface 204 and the battery interface 206 can be electrically connected by separate wires, a printed circuit board or any other suitable means for electrically connecting the power tool interface 204 and the battery interface 206.

In this way, the removeable power tool 102 and the removeable battery 130 are respectively electrically connected to the power tool interface 204 and the battery interface 206 when mounted to the power tool carriage 108. This means that when mounted to the power tool carriage 108, the removeable battery 130 can supply power to the removeable power tool 102. Accordingly, the removeable power tool 102 can be powered by the removeable battery 130 when both mounted on the power tool carriage 108 as if the removeable battery 130 and the removeable power tool 102 are directly coupled together.

Figure 3:
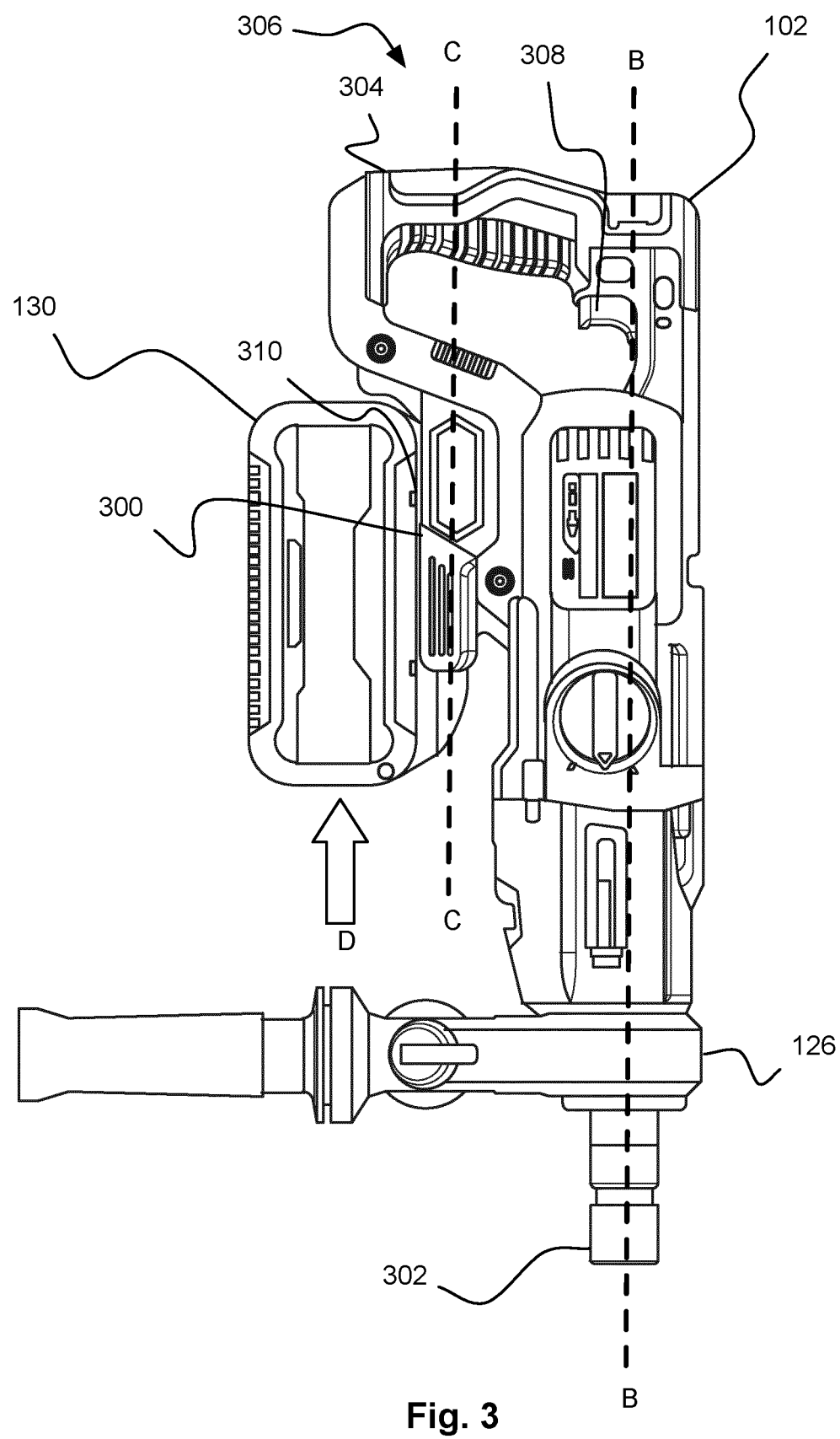
FIG. 3 shows a side view of an exemplary power tool mountable on a power tool stand according to an example.

In some examples, operation of the removeable power tool 102 when mounted on the power tool stand 100 is no different from when the removeable power tool 102 is directly connected to the removeable battery 130 as shown in FIG. 3. FIG. 3 shows a side view of the removable power tool 102 with a removeable battery 130 mounted to the removeable power tool 102. The user can therefore intuitively use the removeable power tool 102 when mounted on the power tool carriage 108.

Turning to FIG. 3, the removeable power tool 102 will now be discussed in more detail. FIG. 3 shows a side view of an the removeable power tool 102.

The removeable power tool 102 as shown in FIG. 3 is an example of a removeable power tool 102 that is mountable on the power tool stand 100. The removeable power tool 102 as shown in FIG. 3 in some examples is a drill. In particular, the removeable power tool 102 is a diamond core drill. In other examples, the removeable power tool 102 can be hammer drill, a router, a reciprocating saw, plunge saw, a circular saw, an impact driver, a drill, a hammer drill, a multitool, an oscillating tool, a rotary hammer, a chipping hammer, or any other similar power tool mountable on a power tool stand 100.

The removeable power tool 102 is battery powered and comprises a tool mounted battery interface 300 for engaging with the reciprocal battery mounted tool interface 310 on the removeable battery 130. The removeable power tool 102 is generally elongate and comprises a longitudinal axis B-B. The removeable power tool 102 and the removeable battery 130 are engageable along a third interface plane C-C. The third interface plane C-C is parallel with the longitudinal axis B-B of the removeable power tool 102. This means that the removeable battery 130 is mounted on the tool mounted battery interface 300 by sliding the removeable battery 130 in a direction D indicated by the arrow in FIG. 3. The direction D is away from the nose 302 of the removeable power tool 102 and towards a rear power tool handle 304 located at the rear 306 of the removeable power tool 102.

In order to mount the removeable power tool 102 and the removeable battery 130 on the power tool stand 100, the removeable battery 130 is disengaged from the removeable power tool 102. This is achieved by reversing the sliding action described above in reference to FIG. 3. The separate removeable power tool 102 and the removeable battery 130 can then be individually mounted on the power tool carriage 108.

As discussed above, both the removeable power tool 102 and the removeable battery 130, are mechanically secured to the power tool carriage 108. This means that the power tool carriage 108 moves in unison with the removeable power tool 102 and the removeable battery 130. This can help the user stabilise the removeable power tool 102 during use and improves the quality of the cut in the workpiece 918.

The power tool interface 204 mounted on the power tool carriage 108 is compatible with the tool mounted battery interface 300. Likewise the battery interface 206 on the power tool carriage 108 is compatible with the battery mounted tool interface 310.

Figure 5:
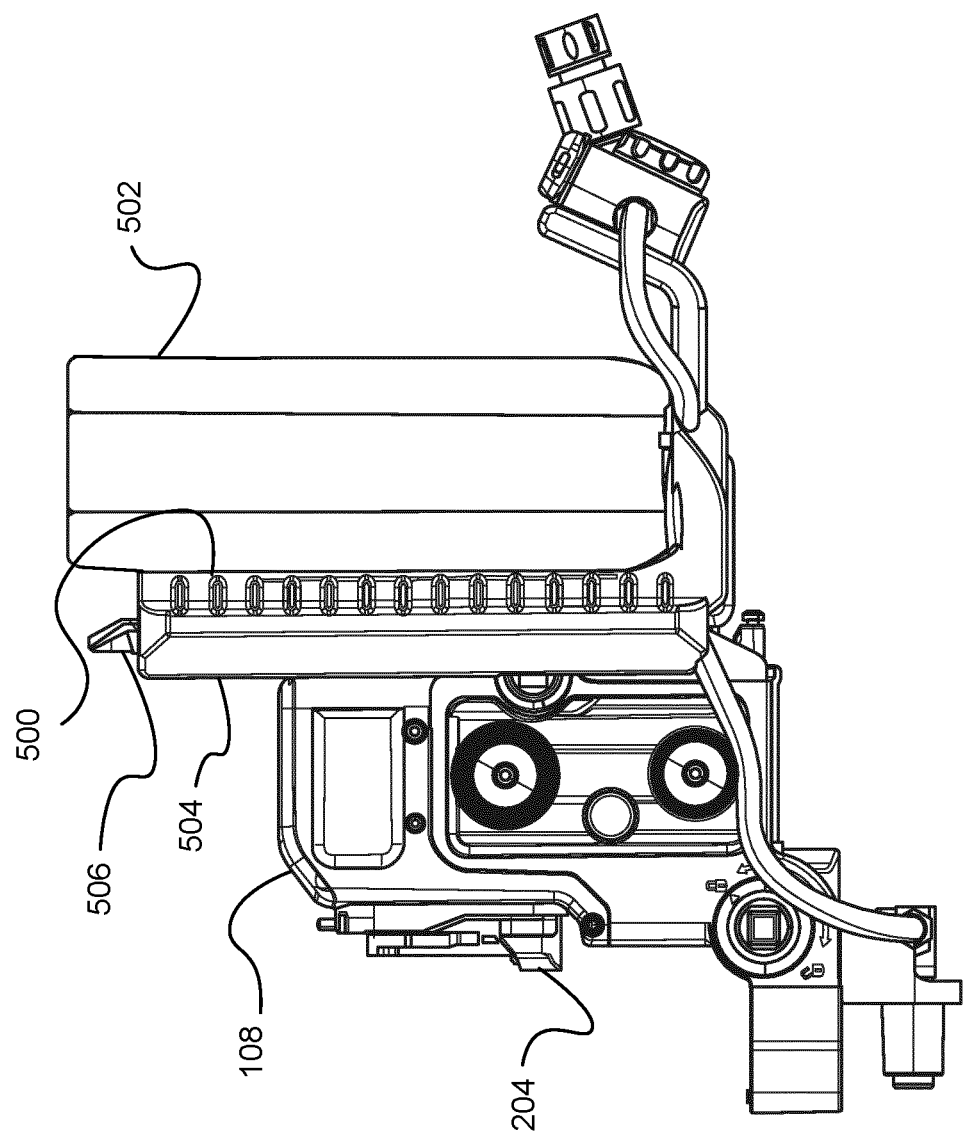
FIG. 5 shows a side view of part of a power tool stand according to an example.

However, in some examples, the tool mounted battery interface 300 on the removeable power tool 102 is not compatible with the battery mounted tool interface 500 on the removeable battery 502 (e.g. as shown in FIG. 5).

For example, the removeable battery 502 as shown in FIG. 5 is a high capacity removeable battery 502 configured to power the removeable power tool 102 when mounted on the power tool stand 100. The high capacity removeable battery 502 may not be suitable for connecting directly to the removeable power tool 102 because the high capacity removeable battery 502 is too large and heavy. In some examples, the mechanical and electrical interfaces of the battery mounted tool interface 500 on the high capacity removeable battery 502 are different from the mechanical and electrical interfaces on the tool mounted battery interface 300 on the removeable power tool 102. That is, the removeable battery 103 as shown in FIG. 3 is different from the high capacity removeable battery 502 as shown in FIG. 5.

This means that that the high capacity removeable battery 502 as shown in FIG. 5 comprises an electrical and mechanical lock out preventing mounting of the high capacity removeable battery 502 on the removable power tool 102. This means only the correct form, shape, and specification of the removeable battery 130 and the high capacity removeable battery 502 can be mounted to the removeable power tool 102 and the power tool stand 100 respectively.

For example, the removeable battery 130 as shown in FIG. 1 is mountable directly to the removeable power tool 102, but the high capacity removeable battery 502 as shown in FIG. 5 is not mountable directly to the removeable power tool 102. Instead, the high capacity removeable battery 502 as shown in FIG. 5 is mountable directly to power tool carriage 108.

In some examples, the power tool carriage 108 optionally comprises a battery adaptor 504. The battery adaptor 504 is configured to mechanically and electrically connect to the high capacity removeable battery 502. The battery adaptor 504 is configured mechanically and electrically connect to the power tool carriage 108. When the battery adaptor 504 is mounted to the power tool carriage 108, the battery adaptor 504 is electrically connected to the power tool interface 204. In some other examples, the battery adaptor 504 is integral with the power tool carriage 108.

The battery adaptor 504 comprises an adaptor battery interface 702 configured to electrically and mechanically couple with the battery mounted tool interface 500 on the high capacity removeable battery 502.

The battery adaptor 504 in some examples is of a modular construction and is removably mountable to the power tool carriage 108. The battery adaptor 504 is mountable to the power tool carriage 108 and is fixed in place with one or more screw fastenings 700. This means that the battery adaptor 504 is fixed to the power tool carriage 108 during normal use. However, during manufacture or maintenance, the battery adaptor 504 can be replaced with another different battery adaptor 504. For example, the battery adaptor 504 as shown in FIG. 5 is suitable for e.g. a 60V high capacity removeable battery 502. In other examples, the battery adaptor 504 is configured to mechanically and electrically connect to any shape, size and capacity of battery. Another battery adaptor (not shown) can be replaced for the battery adaptor 504 as shown in FIG. 5 to connect a different battery to the power tool carriage 108. The different battery can have a different shape, size, voltage from the high capacity removeable battery 502 as shown in FIG. 5 or the removeable battery 130 as shown in FIG. 1.

Figure 7:
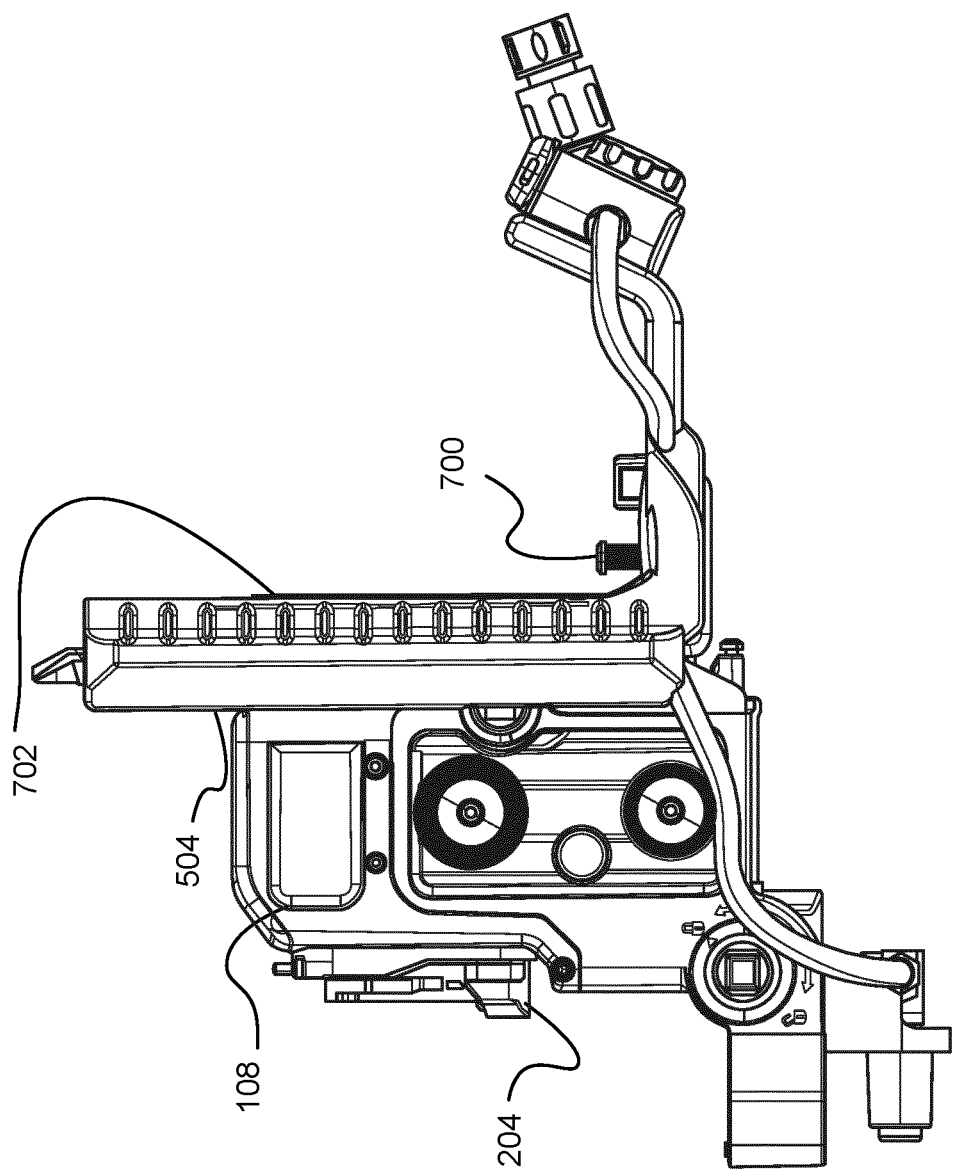
FIG. 7 shows a side view of part of a power tool stand according to an example.

The removeable battery adaptor 504 as shown in FIGS. 5 and 7 comprises a carriage interface (not shown) and the power tool carriage 108 comprises an adaptor interface (not shown) and carriage interface is compatible with the adaptor interface. This means that the carriage interface on the battery adaptor 504 and the adaptor interface on the power tool carriage 108 are arranged to electrically and mechanically connect together. This means that the battery adaptor 504 can be conveniently plugged into the power tool carriage 108 and makes manufacture easier.

In some examples, the carriage interface on the battery adaptor 504 is the same as the power tool interface 204 on the power tool carriage 108. Furthermore in some examples the adaptor interface on the power tool carriage 108 is the same as the tool mounted battery interface 300 on the removeable power tool 102. In other words, when the battery adapter 504 is removed from the power tool carriage 108, the removeable battery 130 as shown in FIG. 1 which is mountable on and compatible with the removable power tool 102 is mountable on the power tool carriage 108.

When the tool mounted battery interface 300 on the removeable power tool 102 is not compatible with the battery mounted tool interface 500, this means that the different methods of attaching the high capacity removeable battery 502 to power tool carriage 108 must be used compared to the method of attaching the removeable power tool 102 to the power tool carriage 108.

In some examples, the battery adaptor 504 comprises a latch mechanism 506. The latch mechanism 506 comprises a spring biased hook portion (not shown) configured to engage a reciprocal recess in the high capacity removeable battery 502. The latch mechanism 506 secures the high capacity removeable battery 502 to the battery adaptor 504. The latch mechanism 506 is depressed to release the spring biased hook portion from the recess and the high capacity removeable battery 502 is then removeable from the battery adaptor 504. Alternatively, the latch mechanism 506 can be mounted on the high capacity removeable battery 502 and the reciprocal recess is located on the battery adaptor 504.

Figure 4:
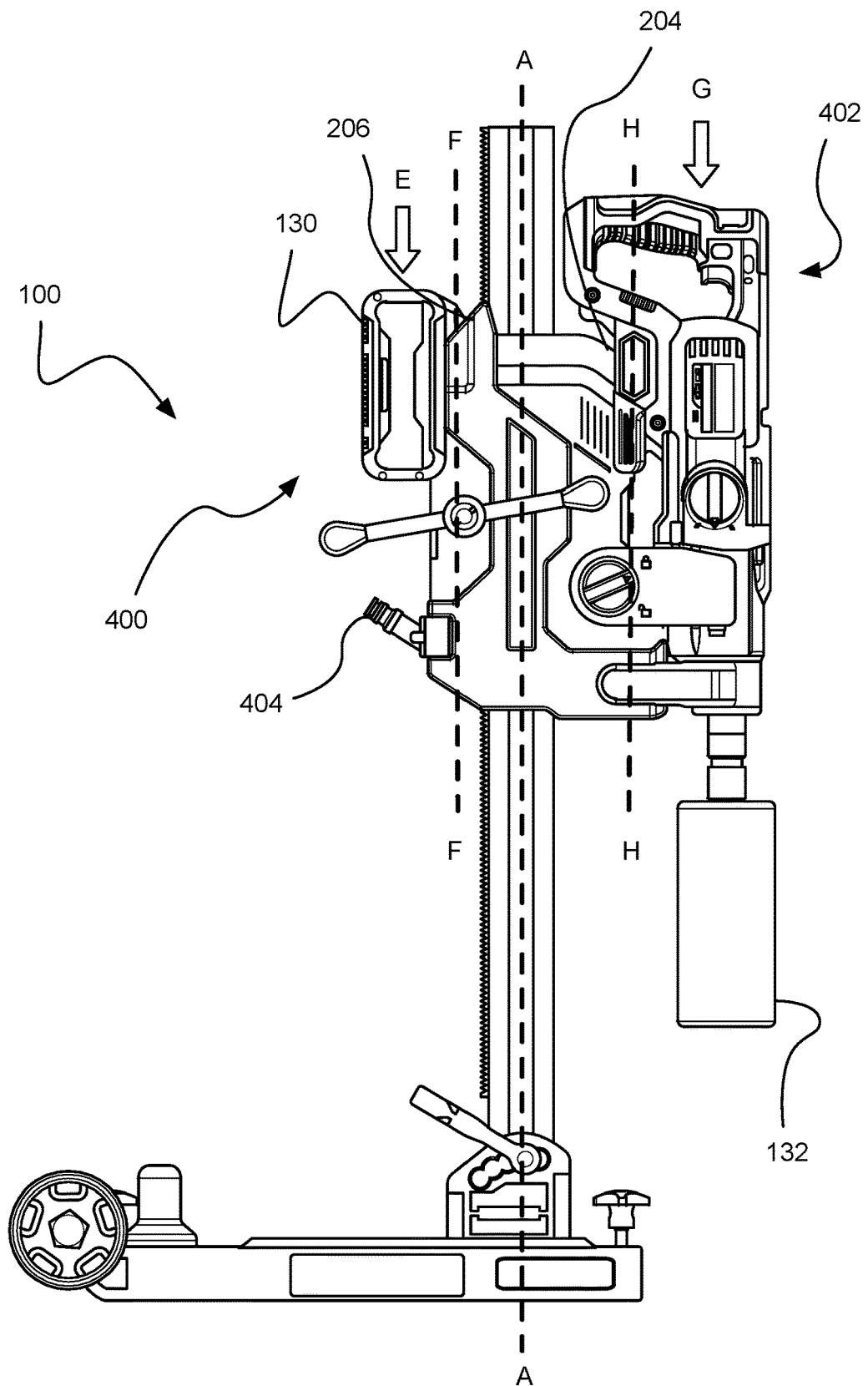
FIG. 4 shows a side view of a power tool stand according to an example.

Mounting the removable power tool 102 and the removeable battery 130 to the power tool stand 100 will be discussed in more detail with reference to FIGS. 4, 6a and 6b. FIG. 4 shows the longitudinal axis A-A of the projecting frame 106. Furthermore, FIG. 4 shows a first interface plane F-F aligned with a plane of the battery interface 206 mounted on the power tool carriage 108. The removeable battery 130 is mountable on the power tool carriage 108 in a direction E represented by the arrow. In some examples, the removeable battery 130 is mountable in the direction E towards the base 104. In some examples, the first interface plane F-F is substantially parallel with the longitudinal axis A-A of the projecting frame 106.

FIG. 4 also shows a second interface plane H-H aligned with a plane of the power tool interface 204 mounted on the power tool carriage 108. The removeable power tool 102 is mountable on the power tool carriage 108 in a direction G represented by the arrow. In some examples, the removeable power tool 102 is mountable in a direction G towards the base 104. In some examples, the second interface plane H-H is substantially parallel with the longitudinal axis A-A of the projecting frame 106. In some examples, the first and second interface planes are substantially parallel.

As shown in FIG. 4, the removeable battery 130 and the removeable power tool 102 are optionally mountable in the same direction E, G with respect to the power tool carriage 108. This is advantageous because the user can use a similar pushing action in the same direction E, G to mount both the removeable battery 130 and the removeable power tool 102 on the power tool stand 100. For example, the user can stand over the power tool stand 100 as shown in FIG. 1 and push down both the removeable power tool 102 and the removeable battery 130 to mount them on the power tool carriage 108. This can make assembly of the removeable power tool 102 and the removeable battery 130 on the power tool carriage 108 easier and more intuitive.

In order to mount the removeable battery 130 and the removeable power tool 102 on the power tool carriage 108, in some examples, both the removeable battery 130 and the removeable power tool 102 slide into mechanical engagement with the power tool carriage 108. The sliding action of the removeable battery 130 and the removeable power tool 102 continues until a latch mechanism (not shown in FIG. 4) engages between the power tool carriage 108 and the removeable battery 130 and/or the removeable power tool 102. In some examples, the battery interface 206 and the power tool interface 204 comprise two latch mechanisms which are the same as the latch mechanism used to hold the removeable battery 130 in engagement when the mounted to the removeable power tool 102. The latch mechanism in some examples is the same as shown in reference to the latch mechanism 506 shown in FIG. 5 on the battery adaptor 504.

The direction E, as shown in FIG. 4, is the direction that the removeable battery 130 is mounted on the power tool carriage 108. The direction E is in a direction opposite to the direction D that the removeable battery 130 is mounted on the removeable power tool 102, as shown in FIG. 3.

Mounting the removeable power tool 102 and the removeable battery 130 on the power tool stand 100 will now be discussed in more detail in reference to FIGS. 6a, and 6b. FIGS. 6a and 6b respectively show a partial front and rear view of a power tool stand 100.

Figure 6B:
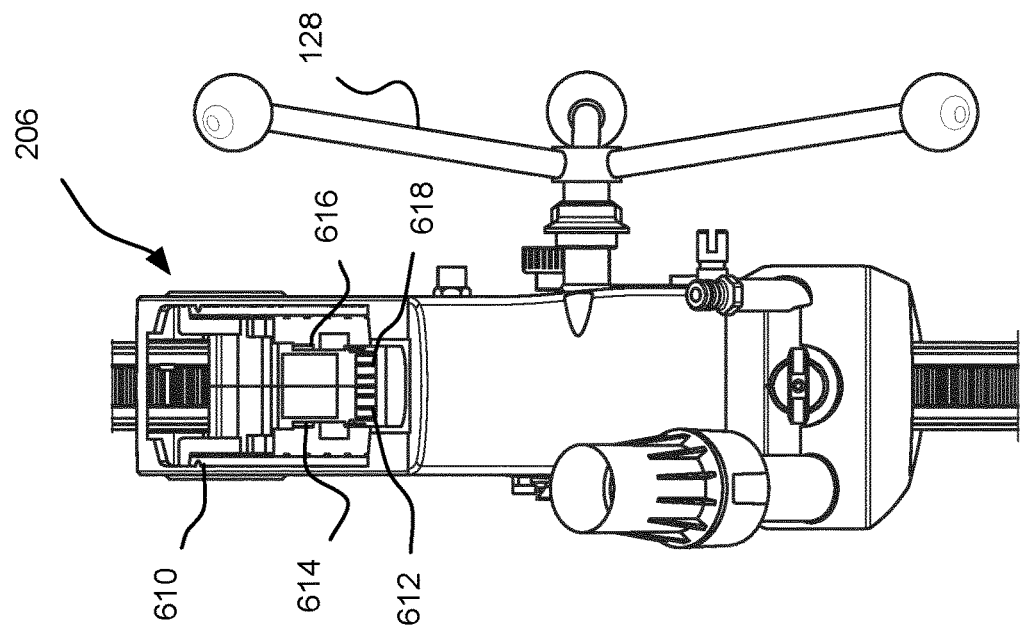
FIGS. 6a and 6b respectively show a partial front and rear view of a power tool stand according to an example.
Figure 6A:
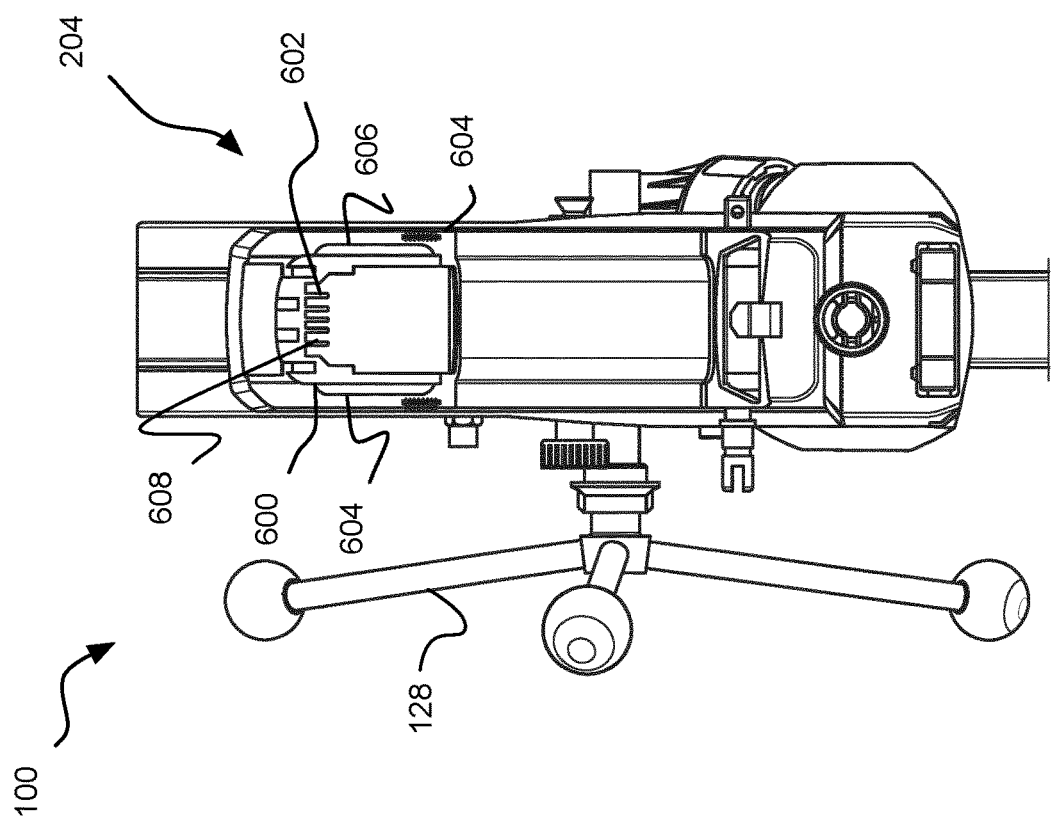

FIGS. 6a and 6b respectively show the power tool interface 204 and the battery interface 206 without the removeable power tool 102 or the removeable battery 130 mounted thereon for the purposes of clarity.

The power tool interface 204 as shown in FIG. 6a comprises a power tool mechanical interface 600 and a power tool electrical interface 602. In some examples, the power tool mechanical interface 600 and the power tool electrical interface 602 are integral with the carriage housing 200. For example, the power tool mechanical interface 600 and the power tool electrical interface 602 are moulded into the carriage housing 200. In some examples, the power tool mechanical interface 600 and the power tool electrical interface 602 are positioned together or near each other on the carriage housing 200. In some other less preferred examples, the power tool mechanical interface 600 and the power tool electrical interface 602 are located remote from each other on the carriage housing 200.

As shown in FIG. 6a, the power tool mechanical interface 600 optionally comprises a pair of rails 604, 606 configured to engage with reciprocal slots mounted on the removeable power tool 102. The pair of rails 604, 600 slide into engagement with the reciprocal slots and secure the removeable power tool 102 to the power tool carriage 108.

The power tool electrical interface 602 optionally comprises a plurality of electrical contact clips 608 configured to engage a plurality of reciprocal projecting contact ribs (not shown) mounted on the removeable power tool 102. For the purposes of clarity only one electrical contact clip 608 is labelled. The power tool mechanical interface 600 and the power tool electrical interface 602 are one optional way of connecting the removeable power tool 102 to the power tool carriage 108.

The battery interface 206 as shown in FIG. 6b comprises a battery mechanical interface 610 and a battery electrical interface 612. In some examples, the battery mechanical interface 610 and the battery electrical interface 612 are integral with the carriage housing 200. For example, the battery mechanical interface 610 and the battery electrical interface 612 are moulded into the carriage housing 200. In some examples, the battery mechanical interface 610 and battery electrical interface 612 are positioned together or near each other on the carriage housing 200. In some other less preferred examples, the battery mechanical interface 610 and the battery electrical interface 612 are located remote from each other on the carriage housing 200.

The battery mechanical interface 610 optionally comprises a pair of slots 614, 616 configured to engage with reciprocal rails mounted on the removeable battery 130. The battery electrical interface 612 comprises a plurality of projecting electrical contact ribs 618 configured to engage a plurality of reciprocal electrical contact clips (not shown) mounted on the removeable battery 130. For the purposes of clarity only one projecting electrical contact rib 618 is labelled in FIG.

6*b*. The battery mechanical interface 610 and the battery electrical interface 612 are one optional way of connecting the removeable power tool 102 to the power tool carriage 108.

In some examples, each of the power tool mechanical interface 600 and the battery mechanical interface 610 can optionally comprises a plurality of rails and slots to further improve the mechanical engagement when mounting the removeable power tool 102 and the removeable battery 130 on the power tool carriage 108. For example, each of the power tool mechanical interface 600 and the battery mechanical interface 610 can each comprise both slots and rails arranged to respectively engage with reciprocal rails and slots.

Alternatively, other mechanisms and features can be used for securely connecting the removeable power tool 102 to the power tool carriage 108. For example, in some less preferred alternatives, the rail and slot arrangement as discussed above is not used for mechanically securing the removeable battery 130 and the removeable power tool 102 to the power tool carriage 108. In this case, other external features on the removeable battery 130 and the removeable power tool 102 are used to securely fasten the removeable battery 130 and the removeable power tool 102 to the power tool carriage 108. In some examples, latches, straps, clips, clamps or any other suitable securing mechanism can be used to secure the removeable battery 130 and the removeable power tool 102.

As mentioned above, in some less preferred examples, the battery interface 206 comprises a battery mechanical interface 610 and a battery electrical interface 612 in separate locations on the power tool carriage 108. Similarly, the power tool interface 204 comprises a power tool mechanical interface 600 and a power tool electrical interface 602 in separate locations on the power tool carriage 108. This can be optionally achieved by making a separate electrical connection not using the previously discussed electrical contacts. For example, the battery electrical interface 612 and the power tool electrical interface 602 can be flexible ribbons projecting through the carriage housing 200 and the flexible ribbons have a plurality of electrical contacts connected thereto. The flexible ribbons can be manually attached to the ensure an electrical connection with the removeable power tool 102 and the removeable battery 130.

In another less preferred example, the removeable battery 130 can be mounted on the power tool carriage 108 in a different direction e.g. opposite or inclined to the direction that the removeable power tool 102 is mounted on the power tool carriage 108.

The removeable power tool 102 is optionally mechanically connected to the power tool carriage 108 only at the power tool mechanical interface 600. However, in some other examples as shown in e.g. FIG. 2, the removeable power tool 102 is mounted to the power tool carriage 108 at a plurality of other mechanical couplings in addition to the power tool mechanical interface 600.

FIGS. 4, 6*a* and 6*b* discuss mounting the removeable battery 130 to the power tool carriage 108 and the removeable power tool 102 to the power tool carriage 108. However similar electrical and mechanical features discussed in reference to FIGS. 4, 6*a* and 6*b* can also be used to mount the high capacity removeable battery 502 to the battery adaptor 504. In addition similar electrical and mechanical features discussed in reference to FIGS. 4, 6*a* and 6*b* can be used to mount the battery adaptor 504 to the power tool carriage 108 in the example when the battery adaptor 504 is removably mountable to the power tool carriage 108.

In some other examples as shown in e.g. FIG. 1 and FIG. 2, the removeable power tool 102 is mounted to the power tool carriage 108 at a plurality of other mechanical couplings in addition to the power tool mechanical interface 600. Another mechanical coupling will now be discussed in reference to FIG. 2.

The power tool carriage 108 optionally comprises a tool clamp 214 configured to secure the removeable power tool 102 to the power tool stand 100. The tool clamp 214 is configured to engage a nose portion 126 (best shown in FIG. 1) of a housing 124 of the removeable power tool 102. The tool clamp 214 may optionally be secured to the nose portion 126 of the removeable power tool 102. When the tool clamp 214 is engaged with the nose portion 126, the removeable power tool 102 is further mechanically coupled to the power tool carriage 108. The coupling between the removeable power tool 102 and the power tool carriage 108 will be discussed in more detail below.

The tool clamp 214 optionally comprises a first clamp arm 216 and a second clamp arm 218 configured to urge towards each other. The first clamp arm 216 and the second clamp arm 218 each comprise a clamp jaw 220. The clamp jaws 220 on the first and second clamp arms 216, 218 are configured to engage a reciprocal housing recess in the nose portion 126 of the housing 124 of the removeable power tool 102. When the first and second clamp arms 216, 218 are engaged with the nose portion 126 between the first and second clamp arms 216, 218, the first and second clamp arms 216, 218 exert a gripping force against the nose portion 126.

By mounting the removeable power tool 102 to the power tool carriage 108 with the tool clamp 214, the removeable power tool 102 does not move with respect to the power tool carriage 108. This means that the user can have the confidence that the removeable power tool 102 is securely mounted to the power tool stand 100 when performing a cutting operation.

As can be seen from FIG. 4, the removeable battery 130 is mounted on a first side 400 of the power tool carriage 108. The removeable power tool 102 is mounted on a second side 402 of the power tool carriage 108. The first side 400 and the second side 402 of the power tool carriage 108 are positioned either side of the projecting frame 106. Accordingly the first side 400 the second side 402 of the power tool carriage 108 are on opposite sides of the power tool carriage 108.

The power tool carriage 108 conveniently positions the removeable battery 130 remote from the removeable power tool 102 when both mounted on the power tool carriage 108.

This means that the weight of the removeable power tool 102 and the removeable battery 130 can be better distributed about the projecting frame 106. For example, the removeable power tool 102 can be mounted closer to the projecting frame 106. This reduces the turning moment of the removeable power tool 102 when mounted on the power tool stand 100. This makes the power tool stand 100 more stable when the removeable power tool 102 is mounted on the power tool carriage 108.

By mounting the removeable battery 130 on an opposite side of the power tool carriage 108 on a different side of the projecting frame 106, the weight of the removeable battery 130 provides a counterweight to the weight of the removeable power tool 102. This further improves the stability of the power tool stand 100 when the removable power tool 102 and the removeable battery 130 are mounted on the power tool stand 100.

The removeable battery 130 as shown in the accompanying Figs is only a single battery mounted on the power tool carriage 108. However, in other examples, the power tool carriage 108 comprises a plurality of battery interfaces 204 mounted on the power tool carriage 108 configured to electrically and mechanically connected a plurality of removeable batteries 130. This will be discussed in more detail below with respect to FIG. 8.

The carriage mechanism (not shown) is mounted within the carriage housing 200 and is arranged to move the power tool carriage 108 with respect to the projecting frame 106 when the carriage mechanism is actuated. The projecting frame 106 projects through a through hole 202 in the carriage housing 200.

In some examples, the carriage mechanism comprises a rack (not shown) and pinion mechanism (not shown) for moving the power tool carriage 108 with respect to the projecting frame 106. A rack is mounted on one side of the projecting frame 106 along the length of the projecting frame 106. A drive gear is mounted on a drive shaft and a mechanism handle 128 is mounted on the drive shaft for manually rotating the drive shaft. The drive gear is optionally rotatably coupled to an intermediate gear and the intermediate gear engages the rack. In some other examples, the drive gear directly engages with the rack. In some other examples, any other suitable mechanism can be used to move the power tool carriage 108 with respect to the projecting frame 106. In some other examples, the mechanism handle 128 is alternatively or additionally replaced with a drive mechanism coupled to a motor (not shown) for assisting the movement of the power tool carriage 108 on the power tool stand 100.

Turning to FIG. 9, another example will now be described. FIG. 9 shows a side view of the power tool stand 100. In some examples, the power tool stand 100 optionally comprises at least one accessory electrical interface 900 configured to connect to at least one accessory. The at least one accessory electrical interface 900 in some examples is an electrical socket 900. The electrical socket 900 is shown in FIG. 9 as a standard mains power socket, however, the electrical socket 900 in some examples is a low voltage or a DC voltage socket. In some examples, the electrical socket 900 is adapted for non-mains power plugs so that only low voltage or DC voltage accessories can be inserted into the electrical socket 900.

The electrical socket 900 is electrically connected to the battery interface 206 and/or the power tool interface 204. By connecting the electrical socket 900 to the battery interface 206, the removeable battery 130 can provide power to the electrical socket 900 when the removeable battery 130 is mounted to the battery interface 206.

In some examples, the accessory that is connected to the electrical socket 900 is a water pump 1000 (best shown in FIG. 10) and/or a vacuum source 904 e.g. a vacuum pump 904 (best shown in FIG. 9). In other examples, the accessory can be any other suitable accessory such as a lamp, worksite radio or any other equipment used in the worksite.

Figure 10:
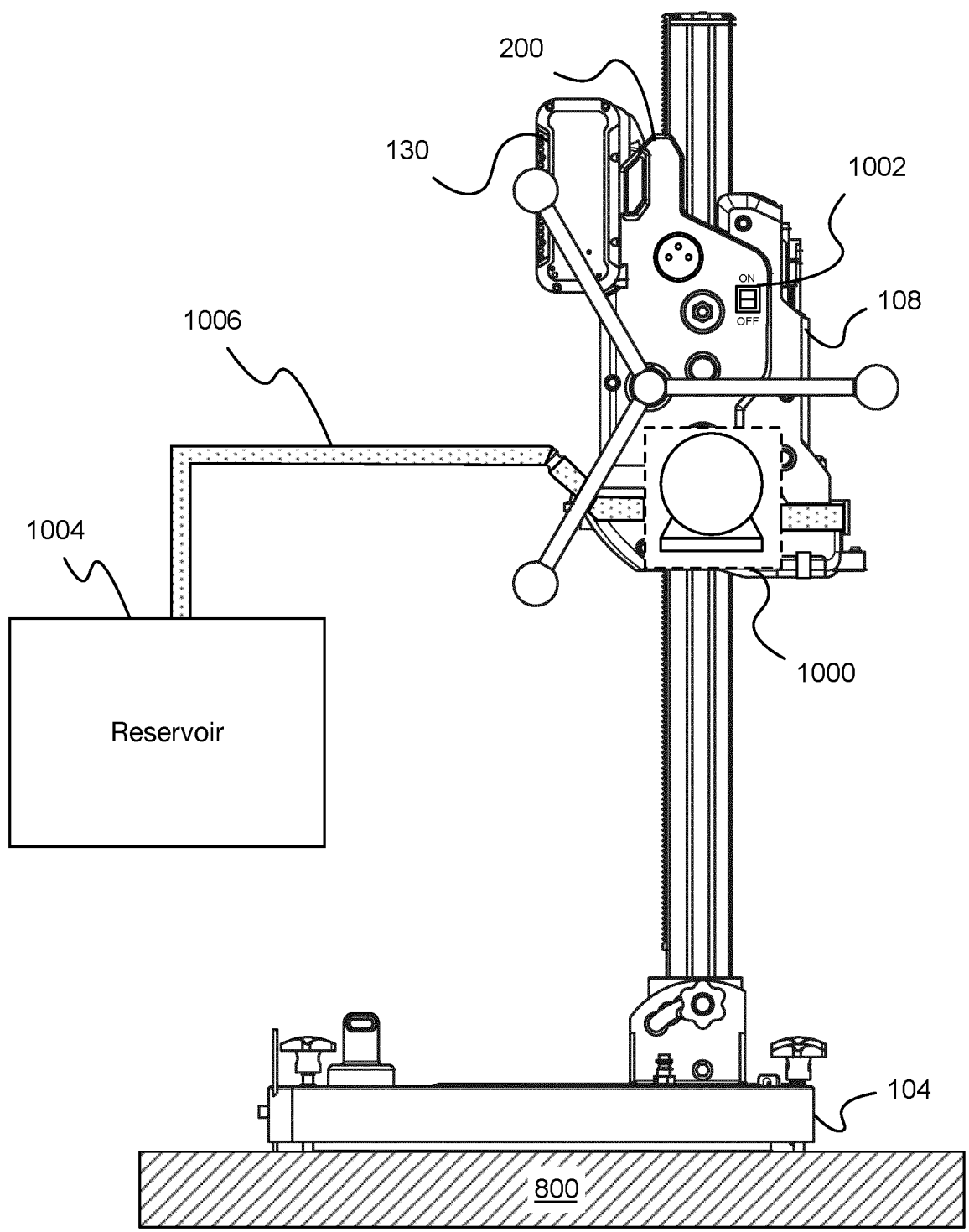
FIG. 10 shows a side view of a power tool stand according to an example.

The electrical socket 900 is optional and in some other examples is not provided. In this case, one or more accessories e.g. water pump 1000 (best shown in FIG. 10) and/or a vacuum source 904 e.g. a vacuum pump 904 (best shown in FIG. 9) are optionally powered from the removeable battery 130 via a power connection 922. FIG. 9 schematically shows a power connection 922 between the removable battery 130 and the vacuum pump 904. Similarly the water pump 1000 as shown in FIG. 10 can also be powered from the removeable battery 130 via the power connection 922 (but the power connection 922 is not shown in FIG. 10 for the purposes of clarity). Whilst FIG. 9 and FIG. 10 show different examples of the power tool stand 100 with different accessories (e.g. the vacuum pump 904 and the water pump 1000) in another example, the power tool stand 1000 can comprise both the vacuum pump 904 and the water pump 1000. In this case, both the vacuum pump 904 and the water pump 1000 can be powered from the removable battery 130 (or the high capacity removeable battery 502).

Operation of the water pump 1000 and the vacuum pump 904 will be discussed below in more detail in reference to FIGS. 9 and 10 respectively.

In an alternative example, the accessory electrical interface 900 is optionally connectable to an external power source and the accessory electrical interface 900 is electrically connected to the first electrical interface and/or the second electrical interface. In some examples, the external power source is a mains power supply or an external battery. When a mains power supply is connected to the accessory electrical interface 900, the mains power supply is arranged to power the removeable power tool 102 and/or charge the removeable battery 130 when the removeable power tool 102 and the removeable battery 130 are mounted on the power tool carriage 108.

In some examples the switch 902 is an ON/OFF switch for the removeable power tool 102. In some examples, the switch 902 is in series with an ON/OFF switch e.g. the power trigger switch 308 on the removeable power tool 102. In this way, the switch 902 must be actuated before the removeable power tool 102 is actuated. This reduces the chances of the removeable power tool 102 being accidentally actuated when mounted on the power tool carriage 108.

In some other examples, the switch 902 is alternatively an actuation switch configured to actuate the water pump 1000 independently of the removeable power tool 102.

In some examples, the switch 902 is configured to wirelessly actuate the water pump 1000 or a vacuum pump 904. In some examples, the switch 902 is configured to control a transmitter-receiver (not shown) mounted in the power tool carriage 108. The transmitter-receiver is configured to send a receive signals from another transmitter-receiver mounted in the removable power tool 102 and/or the external accessory. The transmitter-receiver is configured to transmit one or more control signals for controlling the removeable power tool 102 and/or the external accessory. In this way, the control of the removeable power tool 102 can be remotely actuated by the power tool carriage 108 via transmission of actuation signals. In some examples the transmitter-receiver mounted on the power tool carriage 108 is configured to transmit actuation signals directly to a transmitter-receiver mounted in the external accessory. Additionally or alternatively transmitter-receiver mounted on the power tool carriage 108 is configured to transmit actuation signals indirectly to a transmitter-receiver mounted in the external accessory via a transmitter-receiver mounted in the removeable power tool 102. In this way, the switch 902 can send a signal to switch off the vacuum pump 904 and/or the water pump 1000.

Water Pump

A problem with some removable power tools 102 e.g. diamond core drills is that they need suitable lubrication management during operation. The power tool stand 100 as shown in the Figs. comprises a suitable lubrication management which will now be discussed in more detail.

As mentioned above, the power tool carriage 108 comprises at least one duct 222 configured to convey a fluid. The at least one duct 222 is best shown in FIG. 2. The at least one duct 222 in some examples is configured to supply a lubrication fluid such as water to the removeable power tool 102. Accordingly, the at least one duct 222 is in fluid communication with a lubrication fluid supply e.g. a water supply such as a water pump 1000 or a water tap (not shown). This allows the at least one duct 222 to supply water to the removeable power tool 102 during use.

In some other examples, the at least one duct 222 is in fluid communication with an air supply or a vacuum source (not shown). Accordingly, the at least one duct 222 is in fluid communication with an air supply or a vacuum source e.g. a compressed air supply (not shown) or a vacuum pump (not shown) configured to extract dirt and debris. This allows the at least one duct 222 to extract debris from the removeable power tool 102.

The at least one duct 222 can be optionally used for conveying a fluid e.g. a lubrication fluid such as water towards the removeable power tool 102 or conveying a fluid e.g. an airflow away from the removeable power tool 102. Hereinafter, the at least one duct 222 will be referred to as a water duct 222, but this could also be an air duct as previously discussed.

As shown in FIG. 2 the water duct 222 is mounted on the outside of the power tool carriage 108. The water duct 222 extends along the surface of the power tool carriage 108. Although not shown, in some examples, the water duct 222 can be secured to the power tool carriage 108 with clips, clamps, or adhesive or any other suitable means. In some alternative examples which are shown in e.g. FIG. 4, the water duct 222 is mounted inside the power tool carriage 108.

The water duct 222 comprises a duct inlet 404 in fluid communication with the water supply. In some examples, the duct inlet 404 comprises a toolless connector for connecting to a water hose. The toolless connector allows for a snap fit connection between the duct inlet 404 and a water hose (not shown). The water duct 222 is also in fluid communication with a fluid connector 224. The water duct 222 can supply water to the moveable fluid connector 224. The fluid connector 224 is optionally moveable between a first position and a second position. FIG. 2. shows the moveable fluid connector 224 in the first position. In the second position the fluid connector 224 is engaged with the removeable power tool 102.

The fluid connector 224 is mounted a connector housing 226. The connector housing 226 protects the fluid connector 224 and houses a fluid connection between the water duct 222 and the fluid connector 224.

Alternatively, or additionally the fluid connector 224 is connectable with an accessory such as a nozzle (not shown). The optional nozzle is arranged to eject a spray of water on the cutting tool 132 in order to cool and lubricate the cutting tool 132. In some other examples, the fluid connector 224 is connectable to an optional adapter (not shown) for guiding the flow of water around the cutting tool 132 and/or the removeable power tool 102.

In some examples, the water duct 222 comprises a carriage valve (not shown) arranged to selectively adjust the flow of fluid to and/or from the portion of the removeable power tool 102. The carriage valve is arranged to be adjustable by the user to selectively adjust the flow of water to the cutting tool 132. The user can optionally fully open or fully close the carriage valve in order to actuate the flow of water through the water duct 222. Furthermore, the carriage valve can optionally be positioned at any position between a fully closed and a fully opened state. This means that the user can adjust the flow rate by manipulating the carriage valve on the power tool carriage 108 depending on the amount of lubrication required during a cutting operation.

As mentioned above, in some examples, the power tool stand 100 comprises a water pump 1000 as shown in FIG. 10. The water pump 1000 as shown in FIG. 10 is mounted inside the carriage housing 200 of the power tool carriage 108. Alternatively, the water pump 1000 can be located outside of the power tool carriage 108. The water pump 1000 can be mounted to the outside of the power tool carriage 108. Alternatively, the water pump 1000 can be mounted to the base 104.

The water pump 1000 is electrically connected to the removeable battery 130 when the removeable battery 130 is mounted to the power tool carriage 108. This means that the removeable battery 130 is configured to power to the water pump 1000. In some examples the power tool carriage 108 comprises a water pump control switch 1002 connected in series between the water pump 1000 and the removeable battery 130. The user can then manually turn on the water pump 1000 when needed by actuating the water pump control switch 1002. In some examples, the controller 1100 (best shown in FIG. 11 or 14) can selectively control actuation of the water pump 1000. For example, the controller 1100 can issue a control signal to the water pump 1000 to actuate the water pump 1000 when the user actuates the power trigger switch 308 on the removeable power tool 102.

The water pump 1000 is in fluid communication with a water reservoir 1004. The water reservoir 1004 is optionally a bucket of water or a water tank. The water pump 1000 can be connected to the water reservoir 1004 via a water hose 1006. The water reservoir 1004 is unpressurised. The water pump 1000 can be any suitable pump configured to draw water from the water reservoir 1004 and convey the water to the water duct 222.

In some examples, the removeable battery 130 is configured to be in electrical connection with both the removeable power tool 102 and the water pump 100 when the removeable battery 130 and the removeable power tool 102 are mounted to the power tool carriage 108.

In some other examples, the removeable battery 130 mounted to power tool carriage 108 is in electrical connection with the water pump 1000 but not the removeable power tool 102. In this case, the power tool carriage 108 comprises a power tool interface which mechanically couples the removeable power tool 102 to the power tool carriage 108.

However, when the removeable power tool 102 and the removeable battery 130 are mounted on the power tool carriage 108, the removeable power tool 102 and the removeable battery 130 are in different electrical circuits. This means that the removeable battery 130 is only in electrical connection with the water pump 1000. In this example, the removeable power tool 102 is powered with an alternate power source e.g. another removeable battery or a mains power supply etc.

In another example, the removeable power tool 102 is electrically connected to a first removeable battery 130 and the water pump 1000 is electrically connected to a second removeable battery 800. Similarly the first removable battery 130 and the second removeable battery 800 are not electrically connected together and are in different electrical circuits. The first removeable battery 130 and the second removeable battery 800 will be discussed in more detail below.

Dual Battery and Battery Control

As mentioned above, in some examples the power tool stand 100 is configured to mechanically and electrically connect to a plurality of batteries 130, 800. For example, a first removeable battery 130 and a second removeable battery 800 can be mounted on the power tool carriage 108 side by side as shown in FIG. 8. The power tool carriage 108 comprises a first battery interface 802 and a second battery interface 804 configured to respectively electrically and mechanically connect the first and second removeable batteries 130, 800 to the power tool carriage 108. The first battery interface 802 and the second battery interface 804 are identical to the battery interface 206 discussed above and shown in e.g. FIG. 2. Alternatively, any number of removeable batteries 130 can be mounted on a similar number of battery interfaces 204.

Any of the other examples can be used together with the arrangement discussed in reference to FIG. 8. For example, the examples using the water pump 1000 as shown in FIG. 10 or the examples using the vacuum pump 904 as shown in FIG. 9 can be used together with the examples discussed in reference to FIG. 8.

In some examples, each of the first removeable battery 130 and the second removeable battery 800 are mounted to the power tool carriage 108 with the battery adaptor 504 as shown in FIGS. 5 and 7. In other words, each of the first battery adaptor 806 and the second battery adaptor 808 as shown in FIG. 8 is the same as the battery adaptor 504 as discussed in reference to FIGS. 5 and 7.

Figure 14:
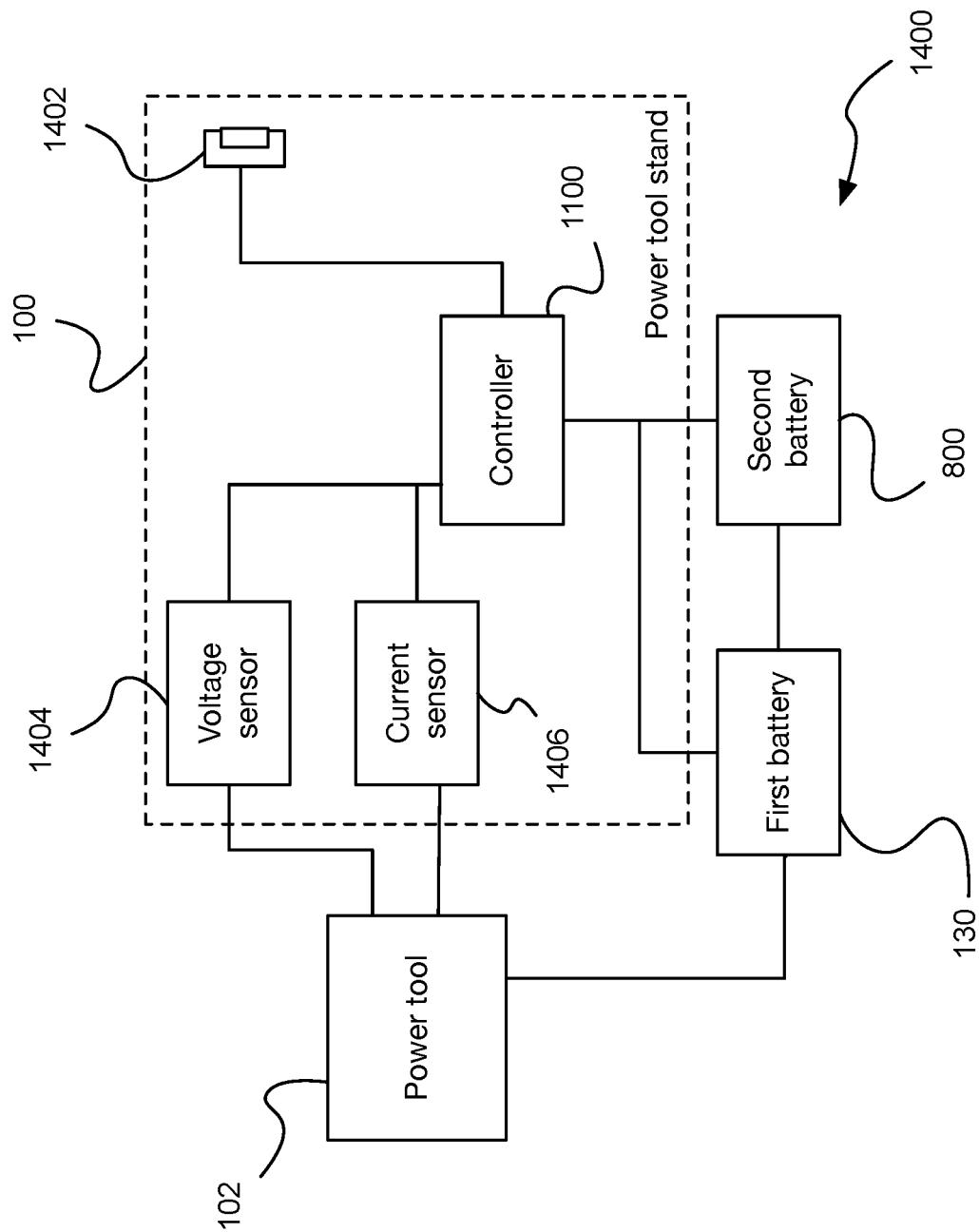
FIG. 14 shows a schematic view of a power tool stand according to an example.
Figure 15:
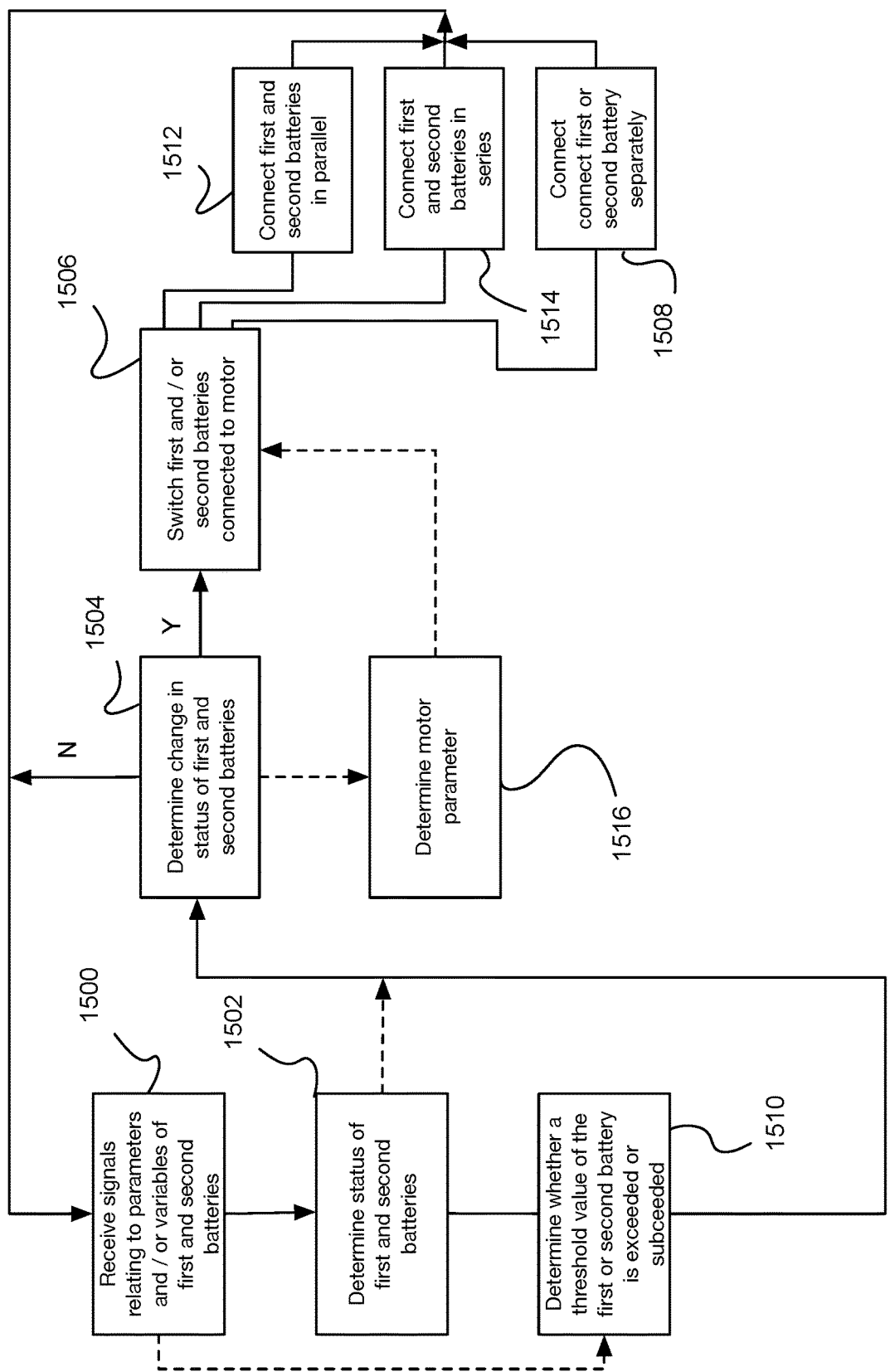
FIG. 15 shows a flow diagram of operation of a power tool stand according to an example.

Examples described with reference to FIGS. 8, 14 and 15 discuss the control of the first battery 130 and the second battery 800. FIG. 14 shows a schematic view of the power tool stand 100 with the removeable power tool 102, the first battery 130 and the second battery 800 mounted to the power tool carriage 108. FIG. 15 shows a flow diagram of operation of a power tool stand 100.

The first battery 130 and the second battery 800 can be each a single battery pack. In other examples, each of the first battery 130 and the second battery 800 can be each a group of battery packs or a group of battery cells. In some examples there can be other battery packs. There can be any number of other battery packs as required. The example discussed below will only have a first battery 130 and a second battery 800 however the control functionality can be applied to any number of battery packs connected to the circuit 1400 of the power tool stand 100. The first and second batteries 130, 800 are identical to the removeable battery 130 as shown in FIG. 1 or alternatively identical to the high capacity removeable battery 502 as shown in FIG. 5.

The first and second batteries 130, 800 are electrically connectable to the removeable power tool 102 when mounted on the power tool carriage 108. The first and second batteries 130, 800 can be connected together to the removeable power tool 102 in series or parallel. Alternatively, first and second batteries 130, 800 are connectable separately to the removeable power tool 102. In other words, only one of the first and second batteries 130, 800 is connected to the removeable power tool 102 at any one time.

In this example, either a controller 1100 or a user is configured to selectively connect the first battery 130 and/or the second battery 800 to the removeable power tool 102. A user can selectively connect the first battery 130 and/or the second battery 800 to the removeable power tool 102 by pressing a user actuated switch 1402 on the power tool stand 100. The user actuated switch 1402 may change the connection between the first battery 130 to the removeable power tool 102 to a connection between the second battery 800 and the removeable power tool 102.

In some examples, the controller 1100 can switch the connection of first and second batteries 130, 800 to the removeable power tool 102 between a series connection of the first and second batteries 130, 800, a parallel connection of the first and second batteries 130, 800, a single connection of the first battery 130 and a single connection of the second battery 800.

The controller 1100 is connected to the first battery 130 and the second battery 800. The controller 1100 is configured to issue control instructions to the first and second batteries 130, 800. In some examples, the controller 1100 is a separate battery controller configured to control the connections of the first and second batteries 130, 800 to the removeable power tool 102.

However, in other examples the controller 1100 is mounted within the power tool carriage 108 and is configured to control the connections of the first and second batteries 130, 800. Accordingly the controller 1100 is configured to selectively connect the first battery 130 and/or the second battery 800 to the removeable power tool 102.

The controller 1100 is configured to receive signals relating to parameters and/or variables for the first and second batteries 130, 800 as shown in step 1500. In a first example, the controller 1100 optionally receives a manual input from a user. The manual input from the user is received from a user actuated battery switch 1402 mounted on the power tool carriage 108. For example, the user actuated battery switch 1402 can be positioned next to the water pump control switch 1002 as shown in FIG. 10. When the controller 1100 receives the signal from the user actuated switch 1402, the controller 1100 determines a status of the first and second batteries 130, 800 as shown in step 1502. For example, the actuation of the battery switch 1402 indicates to the controller 1100 that the first battery 130 connected to the removeable power tool 102 has a low charge status.

The user may actuate the battery switch 1402 in response to the user seeing that the charge in the first battery 130 is depleted. The user may determine the charge status from the first battery 130 itself. For example, the first battery 130 may comprise charge indication LEDs (not shown). In another example, a display (e.g., a row of LEDs or a screen) may be provided on the power tool carriage 108 (or any other part of the power tool stand 100 that is in the line of sight of the user from the operating position) that displays a state of charge for each of the first and second batteries 130, 800.

The display may be electrically connected to first and second batteries 130, 800 directly or via the controller 1100. In another example, the display may wirelessly communicate (e.g., via Bluetooth) with the controller 1100 to receive state of charge information wirelessly.

Once the controller 1100 determines that the user has actuated the battery switch 1402, the controller 1100 determines that a change in status of the first battery 130 has occurred as shown in step 1504. This means that there is a required change connection status of the current battery e.g. the first battery 130 connected to the removeable power tool 102. The controller 1100 then issues a control instruction to the circuit 1400 to connect the second battery 800 to the removeable power tool 102 as shown in step 1506. At the same time the controller 1100 issues another control instruction to disconnect the first battery 130 from the removeable power tool 102. In this way the controller 1100 separately connects the first or second batteries 130, 800 to the removeable power tool 102 as shown in step 1508. Once the second battery 800 is connected to the removable power tool 102, the user can continue operating the removable power tool 102.

In another example, there is optionally no manual input from the user via the battery switch 1402. Instead the controller 1100 selectively controls the connection of the first battery 130 and/or the second battery 800 automatically. For example, the controller 1100 can switch the connection to the removeable power tool 102 between the first and second batteries 130, 800 in dependence of the operational status of the first and second batteries 130, 800.

In some examples, in step 1500 the controller 1100 is configured to receive operational status information from the first and second batteries 130, 800. The operational status information can comprise one or more of the following battery voltage, battery capacity, battery temperature, battery discharge rate, battery current or any other battery parameter or status information. In some examples, the controller 1100 is connected to a voltage sensor 1404 and a current sensor 1406 to respectively send voltage signals and current signals to the controller 1100.

Once the controller 1100 has received the signal from the first and second batteries 130, 800, the controller 1100 determines the current status information of the first and second batteries 130, 800 in step 1502. For example, the controller 1100 determines that the first battery 130 which is connected to the removeable power tool 102 has an instantaneous operating temperature, an instantaneous operating voltage and/or an instantaneous remaining battery capacity.

The controller 1100 then compares the determined status information of the first and second batteries 130, 800 to predetermined threshold values as shown in step 1510. The predetermined threshold values may optionally comprise operating voltage ranges, operating battery capacity and operating battery temperature. In some examples, the predetermined threshold values are a look up table stored in memory of the controller 1100.

For example, in step 1510 the controller 1100 determines that the battery capacity of the first battery 130 connected to the removeable power tool 102 has dropped below a threshold of e.g. 30%, 25%, 20%, 15%, 10%, or 5% of the total battery capacity of the first battery 130.

Alternatively, in step 1510 the controller 1100 determines that the operating temperature of the first battery 130 connected to the removeable power tool 102 has exceeded an operating temperature threshold e.g. 60° C., 55° C., 50° C., 45° C., 40° C. etc.

Once the controller 1100 has determined that the first battery 130 is operating outside the normal operating parameters in step 1510, the controller 1100 determines similarly in step 1504 that the operational status of the first battery 130 has changed. Accordingly, the controller 1100 issues a control instruction in step 1506 to the circuit 1400 to connect the second battery 800 to the removeable power tool 102 and disconnect the first battery 130 from the removeable power tool 102 as shown in step 1508.

If the controller 1100 determines that the first battery 130 is operating normally in step 1504 and there has not been a change in the operational status of the first battery 130, the controller 1100 does not issue a control instruction to change the connection to the removeable power tool 102 between the first and second batteries 130, 800. Instead, the controller 1100 returns to step 1500 continues to receive signals relating to parameters and/or variables relating to the first and second batteries 130, 800.

Optionally, the controller 1100 can issue a control instruction to the circuit 1400 to connect the first and second batteries 130, 800 in parallel as shown in step 1512 or in series as shown in step 1514. This can provide a different voltage and current to the removeable power tool 102 if required.

As mentioned above, in some examples the first and second batteries 130, 800, comprise battery circuits comprising a battery controller. The controller 1100 in some examples is configured to receive operational data from the battery controller as shown in step 1500. In some examples, the operational data is one or more error signals e.g. an error code indicating a fault or malfunction of the first or second batteries.

In this case in the controller 1100 determines a fault status of the first battery 130 in step 1502. The controller 1100 determines that the first battery 130 has changed from normally operating to malfunctioning and needs to be disconnected from the removeable power tool 102. The controller 1100 then connects the second battery 800 to the removeable power tool 102 and disconnects the first battery 130 as previously discussed.

In another example, the controller 1100 is optionally configured to optimizing the voltage provided to the removeable power tool 102 by selectively connecting the first and second batteries 130, 800 to the removeable power tool 102. In this way, the controller 1100 is configured to optimize the voltage provided to the removeable power tool 102 as the first and second batteries 130, 800 discharge.

The controller 1100 is optionally configured to determine a removable power tool 102 parameter e.g. a motor parameter in step 1516. The controller 1100 determines that the motor of the removeable power tool 102 may be rated for a first voltage, e.g., 40V. The controller 1100 in some examples determines the motor voltage rating based on information stored in memory of the controller 1100. The controller 1100 may determine that the first and second batteries 130, 800, at full charge, provide a second voltage. In some examples, the second voltage is higher than the first voltage e.g., 60V.

In some cases, the controller 1100 selectively connects the first and second batteries 130, 800 to the removeable power tool 102. This means that the controller 1100 does not need to use pulse width modulation (PWM) at a duty cycle to provide the lower first voltage to the removeable power tool 102 from e.g., the first battery 130 at the higher second voltage.

This can be advantageous because the controller 1100 can avoid the inherent losses caused by PWM switching. In this case, the controller 1100 can selectively connect the first and second batteries 130, 800 to the removeable power tool 102 with a 100% duty cycle.

In some examples, in steps 1502, 1504 the controller 1100 determines the current battery capacity of the first battery 130 and the second battery 800. The controller 1100 may determine that the first battery 130 and the second battery 800 may have a different state of charge. Accordingly, the controller 1100 determines that the first battery 130 and the second battery 800 have different instantaneous voltages.

After the controller 1100 determines the motor voltage rating in step 1516, the controller 1100 determines which of the first and second batteries 130, 800 has an instantaneous voltage closer to the motor voltage rating. The controller 1100 in step 1506 connects to either the first battery 130, or the second battery 800 in dependence of which instantaneous voltage of the first and second batteries 130, 800 is closer to the motor voltage rating. In this way, the controller 1100 can supply the correct voltage to the motor of the removeable power tool 102 whilst minimizing the PWM switching.

In step 1506, if the controller 1100 determines that the motor voltage rating is 40V and the first battery 130 has an instantaneous voltage of 60V and the second battery 800 has an instantaneous voltage of 45V, then the controller 1100 will connect the second battery 800 to the motor of the removeable power tool 102. This is because the voltage of the second battery 800 is closer to the motor voltage rating. This will mean that it may be more efficient to run the motor of the removeable power tool 102 from the second battery 800 so that limited or no PWM switching is needed.

In another example, controller 1100 determines that the motor of the removeable power tool 102 requires different voltages in dependence of the motor speed. Accordingly in step 1516, the controller 1100 determines the required motor speed. Information relating to the required motor speed in some examples is received by the controller 1100 in a signal. The signal may be generated by a user input e.g., a trigger switch or a speed dial. In step 1516, the controller 1100 determines that a high motor speed or a low motor speed is required. The controller 1100 determines the high motor speed voltage or the low motor speed voltage. Accordingly, the controller 1100 determines the required motor voltage. The controller 1100 determines in step 1506 which of the voltages of the first or second batteries 130, 800 most closely matches the required motor voltage.

For example, the controller 1100 may determine that the required motor voltage for a low-speed rating is 40V and the first battery 130 has an instantaneous voltage of 60V and the second battery 800 has an instantaneous voltage of 40V. In this case, the controller 1100 determines in step 1506 that the second battery 800 voltage is closest to the required motor voltage. The controller 1100 then connects the second battery 800 to the motor of the removeable power tool 102.

Alternatively, the controller 1100 may determine that the required motor voltage for a high-speed rating is 60V and the first battery 130 has an instantaneous voltage of 60V and the second battery 800 has an instantaneous voltage of 40V. In this case, the controller 1100 determines in step 1506 that the first battery 130 voltage is closest to the required motor voltage. The controller 1100 then connects the first battery 130 to the motor of the removeable power tool 102.

Furthermore, in some examples, the controller 1100 is configured to connect the first and second batteries 130, 800 in series in step 1514, or in parallel in step 1512, in order to generate a voltage supplied by the first and second batteries 130, 800 as close as possible to match the required motor voltage.

Vacuum Seal

Figure 11:
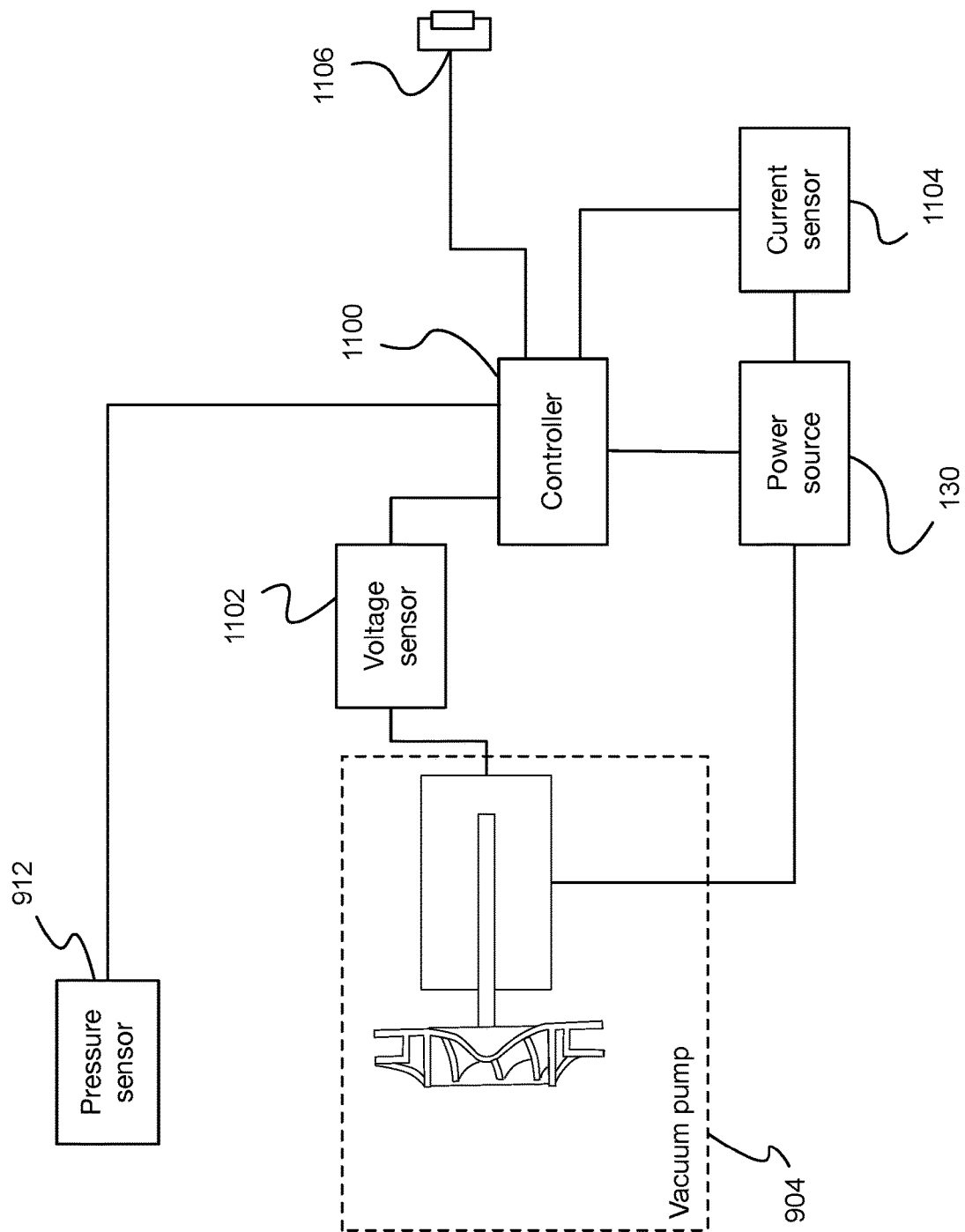
FIG. 11 shows a schematic view of a power tool stand according to an example.
Figure 12:
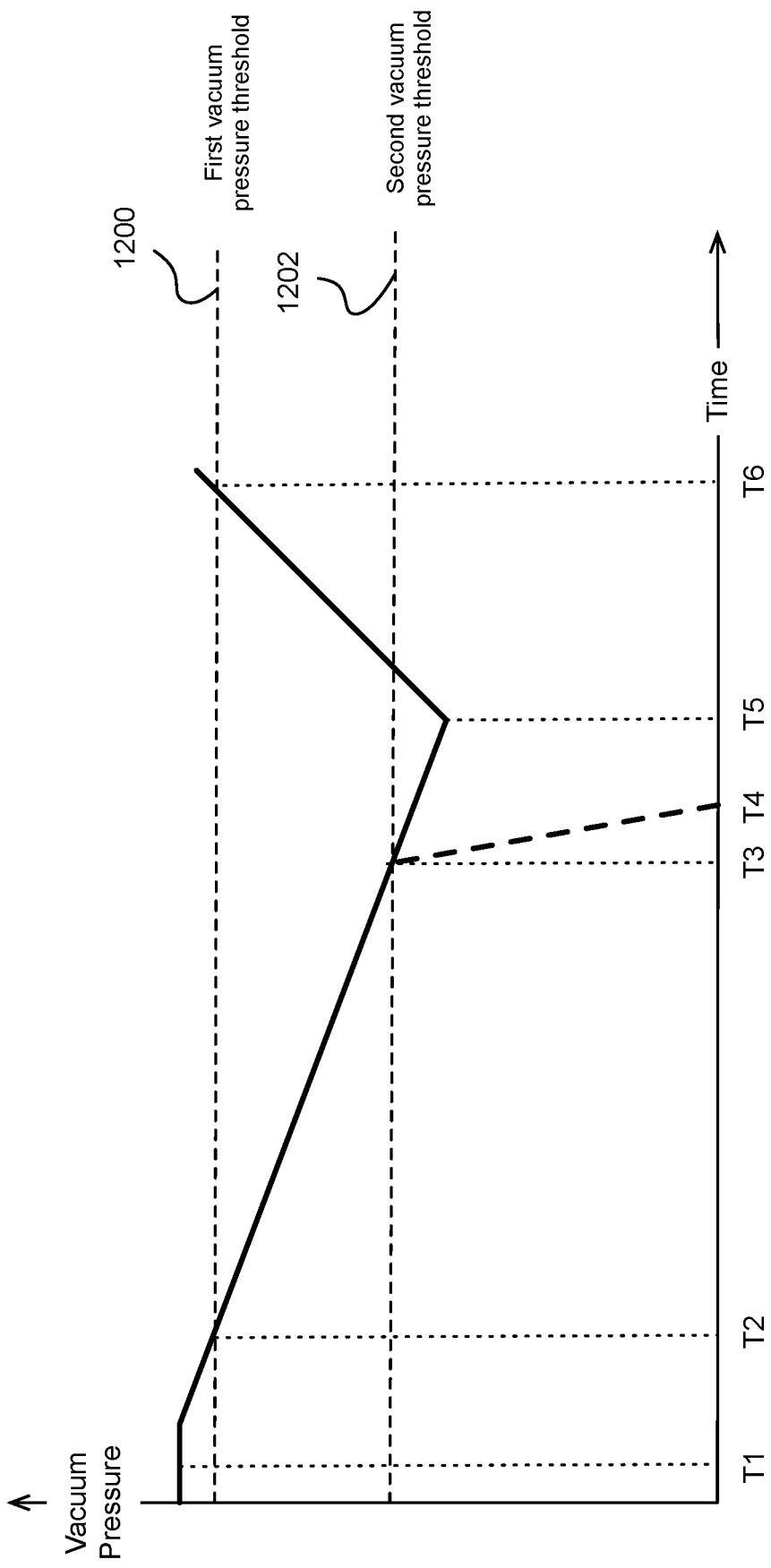
FIG. 12 shows a graph of pressure of a workpiece surface seal over time according to an example.
Figure 13:
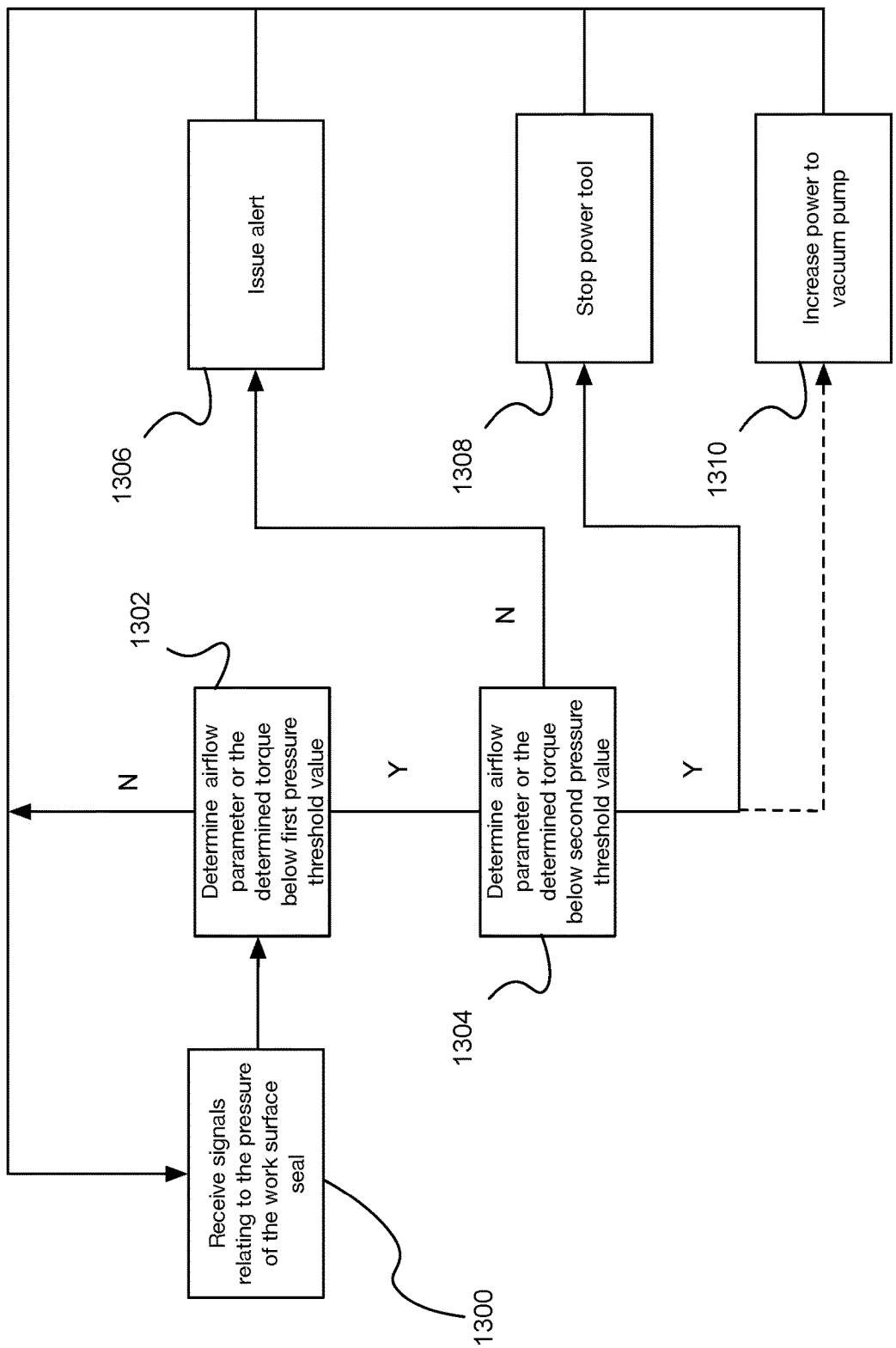
FIG. 13 shows a flow diagram of operation of a power tool stand according to an example.

Another example will now be discussed in reference to FIGS. 9, 11, 12, 13 and 14. FIG. 9 shows a side view of the power tool stand 100. FIG. 11 shows a schematic view of the power tool stand 100. FIG. 12 shows a graph of pressure of a workpiece surface seal 906 time. FIG. 13 shows a flow diagram of operation of the power tool stand 100.

FIG. 14 shows a schematic view of the power tool stand 100.

The power tool stand 100 as shown in FIG. 9 is the same as discussed in reference to the FIGS. 1 to 8 except that the base 104 is modified. The base 104 comprises a work surface seal 906 mounted in the base 104 and configured to engage the workpiece surface 920. The work surface seal 906 is configured to maintain a vacuum seal against the workpiece surface 920. This means that the work surface seal 906 provides a suction force for fixing the power tool stand 100 against the workpiece surface 920. The workpiece surface 920 in some examples (not shown in FIG. 9) is a vertical surface such as a wall. This means that the work surface seal 906 allows the power tool stand 100 to be more easily or better fixed to the vertical surface.

Whilst FIG. 9 shows a single work surface seal 906, in other examples there can be a plurality of work surface seals 906 mounted on the base 104.

In some examples, the work surface seal 906 generates a sufficiently large suction force that only the work surface seal 906 is needed to fix the power tool stand 100 to the workpiece surface 920. In other examples, the work surface seal 906 is used together with other fixing attachments e.g. the fixing bolts 120 as shown in FIG. 1.

The work surface seal 906 is in fluid communication with a vacuum source 904. In some examples the vacuum source 904 is a vacuum pump 904 connected to the work surface seal 906 via a hose 908. Whilst FIG. 9 shows the vacuum pump 904 remote from the power tool stand 100, in some other examples, the vacuum pump 904 is mounted on the power tool carriage 108 or the base 104. The vacuum pump 904 as shown in FIG. 9 is optionally mounted in a vacuum pump housing which is mounted to the base 104. The vacuum pump housing can be fixed to base 104 via threaded fasteners. One or more suction conduits or hoses are in fluid communication between the vacuum pump 904 and the work surface seal 906. The one or more suction conduits or hoses can extend through the base 104 to the work surface seal 906 as schematically shown in FIG. 9.

Alternatively, the vacuum pump 904 is mounted within the power tool carriage 108. The vacuum pump 904 comprises a motor fan assembly 910 configured to generate a negative pressure airflow. When the vacuum pump 904 is actuated, the vacuum pump 904 is configured to generate a partial pressure or vacuum pressure in the work surface seal 906 which causes a suction force on the work surface seal 906 against the workpiece surface 920.

Any suitable vacuum source 904 means can be used to generate to the negative pressure air flow to cause the suction force. For example, the arrangement as shown in FIG. 9 shows a vacuum source 904 connected via the hose 908 to the work surface seal 906. Alternatively, the negative pressure air flow can be generated next to the work surface seal 906 in the base 104. For example, a venturi nozzle (not shown) mounted next to and in fluid communication with the work surface seal 906 can be connected to a source of compressed air. The venturi nozzle can generate the negative pressure air flow when the source of compressed air flows into the venturi nozzle. The vacuum pump 904 can be manually actuated by a user operated vacuum pump control switch 1106. This means that the control of the vacuum pump 904 can be achieved manually and without the need of a controller 1100 or a pressure sensor 912 as shown in FIG. 9. In some examples, once the user manually actuates the vacuum pump 904, the vacuum pump 904 is configured to generate a vacuum pressure at a predetermined pressure e.g. a pressure set point. This means that the suction force can be applied at the work surface seal 906 without automatic control.

The vacuum pump 904 is optionally electrically connected to the removeable battery 130 when the removeable battery 130 is mounted to the power tool carriage 108. This means that the removeable battery 130 is configured to power to the vacuum pump 904. In some examples the power tool carriage 108 comprises a vacuum pump control switch 1106 connected in series between the vacuum pump 904 and the removeable battery 130. The user can then manually turn on the vacuum pump 904 when needed by actuating the vacuum pump control switch 1106. In some other examples, the vacuum pump 904 is alternatively optionally electrically connected to a separate independent battery (not shown) mounted to the vacuum pump 904 or the power tool stand 100. In this case, there are two removable batteries 130 mounted to the power tool stand which are each part of a separate electrical circuit e.g. an electrical circuit for the removeable power tool 102 when mounted on the power tool stand 100 and another electrical circuit for the vacuum pump 904.

Additionally or alternatively, the vacuum pump 904 can be optionally controlled by a controller 1100 and vacuum source 904 is connected to a controller 1100. Alternatively, this means that the vacuum pump 904 can be controlled without manual input from the user as mentioned above. The controller 1100 is configured to issue control instructions to the vacuum source 904 and/or the removeable power tool 102. For example, the controller 1100 is configured to actuate and control the speed and direction of the motor fan assembly 910. The controller 1100 is also configured to control the removeable power tool 102 in response to one or more detected conditions in the work surface seal 906. The controller 1100 is connected to the removeable power tool 102 via a first data connection 914. The controller 1100 as shown in FIG. 9 is external to the power tool stand 100. However, in some other examples, the controller 1100 is mounted within the power tool carriage 108.

The controller 1100 is also optionally connected to at least one sensor 912 via a second data connection 916. The at least one sensor 912 is a pressure sensor 912 configured to detect the pressure in the work surface seal 906. The pressure sensor 912 is configured to send a pressure signal to the controller 1100. The pressure sensor 912 can periodically detect the pressure and send a pressure signal to the controller 1100. In other examples, the pressure sensor 912 constantly sends a pressure signal to the controller 1100. In some examples, the pressure sensor 912 is configured to detect the vacuum pressure at the work surface seal 906.

In some other examples, the controller 1100 is configured to receive the raw pressure signal from the pressure sensor 912 and determine the vacuum pressure at the work surface seal 906.

The controller 1100 in some examples is optionally connected to a vacuum pump voltage sensor 1102 and a vacuum pump current sensor 1104 which are configured to respectively send voltage and current signals relating to the motor fan assembly 910 of the vacuum source 904. This means that the controller 1100 can optionally determine the load on the vacuum source 904 and determine whether there is a fault with the vacuum source 904 or whether an adequate seal has been made between the work surface seal 906 and the workpiece surface 920.

Operation of the work surface seal 906 will now be discussed in further detail with respect to the FIG. 13.

The controller 1100 receives a pressure signal from the pressure sensor 912 in step 1300. The controller 1100 then determines whether the received pressure signal is below a first vacuum pressure threshold 1200 as shown in step 1302. At T=TI as shown in FIG. 12 the controller 1100 determines that the received pressure signal is at a first vacuum pressure signal. It should be noted that the graph in FIG. 12 shows the vacuum pressure at the work surface seal 906 over time. This means a higher vacuum pressure indicates a lower absolute pressure and a lower vacuum pressure indicates a higher absolute pressure. In other words as the vacuum pressure tends to zero in FIG. 12, the absolute pressure in the work surface seal 906 tends to atmospheric pressure.

The first vacuum pressure threshold 1200 is a threshold that indicates that the seal between the work surface seal 906 and the workpiece surface 920 is not perfect. This means that there is a suction force being exerted by the work surface seal 906, but this is not a maximum suction force that can be exerted by the work surface seal 906.

When the vacuum pressure in the work surface seal 906 is between the first vacuum pressure threshold 1200 and a second vacuum pressure threshold 1202, the power tool stand 100 and removeable power tool 102 are operable. However, the user should be notified that suction force may not be sufficient to safely operate the removeable power tool 102 on the power tool stand 100. The second vacuum pressure threshold 1202 is lower than the first vacuum pressure threshold 1200. This means that a pressure in the work surface seal 906 at the second vacuum pressure threshold 1202 has a worse seal between the work surface seal 906 and the workpiece surface 920 than when the pressure in the work surface seal 906 is at the first vacuum pressure threshold 1200.

Since the controller 1100 determines that the pressure is above the first vacuum pressure threshold 1200, the controller 1100 returns to step 1300 and continues monitoring the pressure in the work surface seal 906.

At time T=T2, the controller 1100 determines that the pressure in the work surface seal 906 has dropped below the first vacuum pressure threshold 1200. This means that the vacuum pressure in the work surface seal 906 is dropping. The controller 1100 then determines whether the pressure in the work surface seal 906 has dropped below a second vacuum pressure threshold 1202 in step 1304. At T=T2, the controller 1100 determines that the pressure is still above the second vacuum pressure threshold 1202.

The controller 1100 then issues an alert to the user in step 1306. The alert can be displayed on an LCD display (not shown) of the removeable power tool 102 or on the power tool stand 100. Alternatively, the alert can be illuminating an LED on the removeable power tool 102 or the power tool stand 100. Alternatively, the alert can be an audible signal or a haptic signal.

If the controller 1100 determines whether the pressure in the work surface seal 906 has dropped below a second vacuum pressure threshold 1202 in step 1304, e.g. at T=T3, the controller 1100 can issue a control instruction to stop the removeable power tool 102 as shown in step 1308. The controller 1100 may actuate a switch to cut the power to the removeable power tool 102 in response to determining that the vacuum pressure at the work surface seal 906 has fallen below the second vacuum pressure threshold 1202. In this case, the controller 1100 may stop the vacuum source 904 as well. Accordingly the vacuum pressure falls to zero at T=T4.

This means that the user can be protected from the power tool stand 100 detaching from the workpiece surface 920 and falling on the user.

In some examples, the controller 1100 in step 1310 may optionally issue a control instruction to the vacuum source 904 following a determination that the vacuum pressure is falling in the work surface seal 906 at T=T5. The controller 1100 issues a control instruction to increase the speed of the motor fan assembly 910 and increase the negative pressure air flow. This can increase the vacuum pressure in the work surface seal 906 such that the vacuum pressure exceeds the first vacuum pressure threshold 1200 at T=T6. The controller 1100 can control the pressure in the work surface seal 906 with a feedback loop from the pressure sensor 912 and controlling the vacuum source 904 as shown in FIG. 13.

Advantageously, by using the pressure sensor 912 which detects the vacuum pressure in the work surface seal 906, the controller 1100 can directly determine whether the vacuum seal against the workpiece surface 920 has deteriorated more accurately. This means the controller 1100 can inform the user more accurately and safely in case there is an issue with the work surface seal 906.

In another example, two or more examples or features are combined. Features of one example can be combined with features of other examples e.g. any of the features described above in on example or shown in one or more Figs can be combined with one or more other features described above or shown in one or more Figs. Examples of the present disclosure have been discussed with particular reference to the examples illustrated. However it will be appreciated that variations and modifications may be made to the examples described within the scope of the disclosure.

The invention claimed is:

1. A power tool stand for a removeable power tool having a first battery interface and a removeable battery having a first tool interface, the power tool stand comprising:
    a base;
    a projecting frame connected to the base; and
    a power tool carriage moveably mounted on the projecting frame, the power tool carriage comprising a second battery interface and a second tool interface;
    wherein the second battery interface is compatible with the first tool interface and the second battery interface is arranged to electrically and mechanically connect together with the first tool interface; and
    the second tool interface is compatible with the first battery interface and the second tool interface is arranged to electrically and mechanically connect together with first battery interface;
    and the first battery interface and the first tool interface are incompatible.

2. A power tool stand according to claim 1, wherein the power tool carriage comprises a battery adapter comprising the second battery interface.

3. A power tool stand according to claim 2, wherein the battery adapter is mountable to the power tool carriage.

4. A power tool stand according to claim 3, wherein the battery adaptor is removably mountable to the power tool carriage.

5. A power tool stand according to claim 2, wherein the battery adapter comprises a carriage interface and the power tool carriage comprises an adaptor interface and adaptor interface is compatible with the carriage interface and the adaptor interface is arranged to electrically and mechanically connect together with carriage interface.

6. A power tool stand according to claim 5, wherein the carriage interface is the same as the second tool interface and the adaptor interface is the same as the first battery interface.

7. A power tool stand according to claim 1, wherein the second battery interface is configured to mechanically and electrically connect to the removable battery, and the removable battery has a voltage of at least 60V.

8. A power tool stand according to claim 1, wherein the power tool stand comprises a rack and pinion mechanism arranged to move the power tool carriage relative to the projecting frame.

9. A power tool stand according to claim 1, wherein the power tool carriage comprises a handle coupled to the rack and pinion mechanism.

10. A power tool stand according to claim 1, wherein the second battery interface is mounted on a first side of the power tool carriage and the second tool interface is mounted on a second side of the power tool carriage.

11. A power tool stand according to claim 1, wherein the second tool interface projects over the base.

12. A power tool stand according to claim 1, wherein the power tool stand comprises a plurality of the second battery interfaces arranged to electrically connect with a plurality of removeable batteries.

13. A power tool stand according to claim 1, wherein the power tool carriage comprises a latch recess for engaging with a latch mechanism mounted on the removeable battery.

14. A power tool stand according to claim 1, wherein the power tool carriage comprises an air duct connectable to a dust extractor.

15. A power tool stand according to claim 1, wherein the power tool carriage comprises a water duct connectable to a water supply.

16. A power tool stand according to claim 1, wherein the second battery interface is electrically connected to the second tool interface within the housing of the power tool carriage.

17. A power tool stand system comprising:
    a power tool stand, the power tool stand comprising:
        a base:
        a projecting frame connected to the base; and
        a power tool carriage moveably mounted on the projecting frame. the power tool carriage comprising a second battery interface and a second tool interface;
    a removeable power tool having a first battery interface, wherein the first battery interface is connectable to the second tool interface of the power tool stand; and
    a first removable battery having a first tool interface, wherein the first tool interface is connectable to the second battery interface of the power tool stand.

18. A power tool stand system according to claim 17, further comprising a second battery having a third tool interface compatible with the first battery interface.

19. A power tool stand, comprising:
    a base;
    a projecting frame; and
    a power tool carriage configured to support a removable power tool and to translate relative to the projecting frame, the power tool carriage comprising a second battery interface and a second tool interface;

wherein the second battery interface is configured to electrically and mechanically connect together with a first tool interface of a removable battery pack;

wherein the second tool interface is configured to electrically and mechanically connect together with a first battery interface of the removable power tool; and wherein the first battery interface and the first tool interface are incompatible.

20. The power tool stand of claim 19, wherein the second battery interface is at a first side of the power tool carriage and the second tool interface is at a second side of the power tool carriage.

* * * * *